US007240068B2

(12) United States Patent
Hsu et al.

(10) Patent No.: US 7,240,068 B2
(45) Date of Patent: Jul. 3, 2007

(54) SERVICE LOGIC EXECUTION ENVIRONMENT (SLEE) THAT IS RUNNING ON A DEVICE, SUPPORTING A PLURALITY OF SERVICES AND THAT IS COMPLIANT WITH A TELECOMMUNICATIONS COMPUTING STANDARD FOR SLEES

(75) Inventors: Willie Hsu, Fremont, CA (US); Tsui-Yu Shuai, Shijr (TW); Anand Katakwar, Fremont, CA (US); Liang-Chih Yuan, Sunnyvale, CA (US)

(73) Assignee: TrueTel Communications, Inc., Santa Clara, CA (US)

( * ) Notice: Subject to any disclaimer, the term of this patent is extended or adjusted under 35 U.S.C. 154(b) by 493 days.

(21) Appl. No.: 10/381,312

(22) PCT Filed: Sep. 6, 2002

(86) PCT No.: PCT/US02/28482

§ 371 (c)(1),
(2), (4) Date: Mar. 24, 2003

(87) PCT Pub. No.: WO03/023735

PCT Pub. Date: Mar. 20, 2003

(65) Prior Publication Data

US 2004/0098396 A1    May 20, 2004

(51) Int. Cl.
*G06F 17/00* (2006.01)
*G06F 17/30* (2006.01)
*H04M 3/42* (2006.01)
*H04L 12/16* (2006.01)

(52) U.S. Cl. .................. 707/102; 707/1; 707/100; 379/201.03; 370/259

(58) Field of Classification Search ................ 707/1–4, 707/10, 100–102, 104.1, 200; 703/21–22, 703/17; 709/218–225; 379/15.03, 111, 112.05, 379/201.03, 201.12; 370/254, 259, 409, 370/428; 717/104, 108, 116, 165
See application file for complete search history.

(56) References Cited

U.S. PATENT DOCUMENTS 4,924,510 A    5/1990 Le (Continued)

FOREIGN PATENT DOCUMENTS

EP    0901296    * 5/1998

(Continued)

OTHER PUBLICATIONS

Kazuhiko Ohkubo "Schema transalation into a unified model for service operation", IEEE 1992, pp. 1010-1015.*

(Continued)

*Primary Examiner*—Srirama Cannavajjala
(74) *Attorney, Agent, or Firm*—Ernest J. Beffel, Jr.; Haynes Beffel & Wolfeld

(57) ABSTRACT

The present invention relates to the field of software-based services in communication networks. More particularly, it includes systems and methods for maintaining and utilizing routing data to handle event notifications generated by call handling in a service logic execution environment. Particular aspects of the present invention are described in the claims, specification and drawings.

14 Claims, 14 Drawing Sheets

U.S. PATENT DOCUMENTS

| | | | |
|---|---|---|---|
| 5,640,319 A | | 6/1997 | Beuning et al. |
| 5,812,533 A | * | 9/1998 | Cox et al. ............... 370/259 |
| 5,835,757 A | | 11/1998 | Oulid-Aissa et al. |
| 5,907,602 A | * | 5/1999 | Peel et al. ............ 379/114.14 |
| 5,933,836 A | * | 8/1999 | Gobat ..................... 707/201 |
| 5,970,120 A | * | 10/1999 | Kasrai ......................... 379/9 |
| 5,974,429 A | | 10/1999 | Strub et al. |
| 5,991,803 A | * | 11/1999 | Glitho et al. ............ 709/220 |
| 5,995,969 A | * | 11/1999 | Lee et al. ................ 707/100 |
| 6,003,035 A | | 12/1999 | Breame |
| 6,023,699 A | * | 2/2000 | Knoblock et al. .......... 707/10 |
| 6,185,519 B1 | * | 2/2001 | Lin et al. .................... 703/21 |
| 6,212,256 B1 | * | 4/2001 | Miesbauer et al. ....... 378/118 |
| 6,263,212 B1 | * | 7/2001 | Ross et al. ................ 455/466 |
| 6,324,547 B1 | * | 11/2001 | Lennert et al. ........... 707/204 |
| 6,338,088 B1 | * | 1/2002 | Waters et al. ............ 709/226 |
| 6,343,292 B1 | * | 1/2002 | Roach et al. ............. 707/101 |
| 6,445,782 B1 | | 9/2002 | Elfe et al. |
| 6,496,831 B1 | * | 12/2002 | Baulier et al. ............ 707/101 |
| 6,513,040 B1 | | 1/2003 | Becker et al. |
| 6,690,782 B2 | * | 2/2004 | Creamer et al. ....... 379/201.12 |
| 6,690,783 B2 | * | 2/2004 | Creamer et al. ....... 379/201.12 |
| 6,731,732 B2 | * | 5/2004 | Creamer et al. ....... 379/201.03 |
| 6,798,771 B1 | * | 9/2004 | Low et al. ................ 370/353 |
| 6,914,969 B2 | * | 7/2005 | Creamer et al. ....... 379/201.03 |
| 6,954,525 B2 | * | 10/2005 | Deo et al. ................. 379/219 |
| 6,973,659 B2 | * | 12/2005 | Smith et al. .............. 719/330 |
| 7,012,916 B2 | * | 3/2006 | Low et al. ................ 370/352 |
| 7,100,107 B2 | * | 8/2006 | Creamer et al. .......... 715/513 |
| 2002/0147726 A1 | * | 10/2002 | Yehia et al. .............. 707/101 |
| 2002/0158765 A1 | * | 10/2002 | Pape et al. ............. 340/573.3 |
| 2003/0120764 A1 | * | 6/2003 | Laye et al. ............... 709/223 |
| 2004/0143453 A1 | * | 7/2004 | Waever ....................... 705/2 |

FOREIGN PATENT DOCUMENTS

| | | | | |
|---|---|---|---|---|
| GB | 2278000 | * | 11/1994 | ............... 15/40 |
| GB | 2278000 A | * | 11/1994 | ............... 15/40 |
| GB | 2322771 A | * | 3/1998 | ................. 7/22 |
| WO | WO 98/42102 | | 9/1998 | |
| WO | WO 00/45265 | * | 8/2000 | ............. 11/273 |
| WO | WO 02/059763 | * | 8/2002 | ............. 15/173 |
| WO | WO 03/023735 | * | 3/2003 | |
| WO | WO 2005/055561 | * | 6/2005 | |

OTHER PUBLICATIONS

Ronstrom,M, "On-line schema update for a telecom database", data engineering proceedings, 18th international conference, Mar. 2000, pp. 329-338.*

Jaewook Shin et al. "A new efficient method of generating processor load data and meta data base in CMS-MX System", Personal wireless communications, Dec. 1997, IEEE International conference, pp. 349-352.*

Iraklis Varlamis et al. "Bridging XML-schema and relational databases: a system for generating and manipulating relational databass using valid XML documents", proceedings of the 2001 ACM Symposium on document engineering, pp. 105-114.*

TrueConverge Service creation environment e-nabling NextGen Services, 2002, 2 pages.*

Steven Grover, Sun Microsystems, Inc. Java in communications, JAIN SLEE, 2005, pp. 1-27.* iForce solution for telecommunications service delivery, Sun microsystems, Whitepaper, sub.com/telecom.*

Neil Wilkinson, "Next generation network services" chapter 12, Internet-based Services, copyright 2002, pp. 155-166.*

"objectivity/DB in telecommunications applications", an objectivity , Inc. White Paper, copyright 2001, 8 pages.*

Aygun,S et al. "conceptual data modeling of multimedia database applications", 1998 proceedings i multi-media database mangement systems workshop, Aug. 1998, pp. 182-189.*

Hirokazu Takatama et al. "Intelligent SIP system for Mobile Internet", NEC Intelligent network workshop 2001.*

JAIN Integrated network APIs for the Java Platform, A white paper describing the JAIN objectives, overall technical architecture and program structure, Nov 200023 pages.*

Venezia C et al. "communication web services composition and integration", ICWS '06 Internati;nal conference on Web services, 2006, pp. 523-530.*

Glitho R.H et al. "creating value added services in internet telephony: an overview and a case study on a high-level service creation environment", IEEE transacitons on systems, man and cybermetics, PartC : applications and reviews, issue: 4, vol. 33, 2003, pp. 446-457.*

Lane,C,H.R. et al. "an entity-based service script editor for IN", eight international conference on software engineering for telecommunication systems and services, 1992, pp. 57-61.* du Bousquet,L et al. "telecommunication software validation using a synchronous approach", ASSET-98, proceedings, IEEE workshop on application-specific software engineering technology, 1998, pp. 98-101.*

Haiges, S. "JAIN/SLEE: EJB for Communications, Opening the telecommunications world for Java," http://java.sys-con.com/read/46230.htm, Sep. 7, 2004. Not Prior Art.

Sakai, H. et al. "A Service Logic Program Generation Method for Advanced Intelligent Network," NTT Network Service Systems Laboratories, 1996, pp. 47-51.

Yang, C. et al. "The Design and Implementation of a Service Logic Execution Environment Platform," Technical Program Conference Record, IEEE, vol. 3 pp. 1911-1917, Nov. 29-Dec. 2, 1993.

International Engineering Consortium, "Intelligent Network (IN) Service Creation," available at http://www.iec.org/online/tutorials/in_serv/, Sep. 27, 2006. Not Prior Art.

"Using JCC for Portable, Network Independent JAIN SLEE Services," available online at http://jainslee.org/application/sleeandjcc.html.

* cited by examiner

SERVICE LOGIC EXECUTION ENVIRONMENT (SLEE) THAT IS RUNNING ON A DEVICE, SUPPORTING A PLURALITY OF SERVICES AND THAT IS COMPLIANT WITH A TELECOMMUNICATIONS COMPUTING STANDARD FOR SLEES

RELATED APPLICATIONS

This application is the National Stage filing of PCT Application No. PCT/US02/28482, filed 6 Sep. 2002, entitled Converged Service Data Automation and claims the benefit of U.S. Provisional Application No. 60/318,123, filed 7 Sep. 2001. entitled Converged Service Data Automation.

This application is related to the commonly owned PCT Application No. PCT/US02/28591, filed 6 Sep. 2002, entitled SLEE Service Convergence and Routing and incorporated herein by reference, which claims the benefit of commonly owned U.S. Provisional Application No. 60/318, 163, filed 7 Sep. 2001, entitled SLEE Service Convergence and also incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

REFERENCE TO COMPUTER PROGRAM LISTING APPENDIX

A computer program listing appendix comprising duplicate copies of a compact disc, named "TTel," accompanies this application and is incorporated by reference. The computer program listing appendix includes the following files:

| File | Size | Date |
|---|---|---|
| FindMeDeployment.java | 986 bytes | created Sep. 3, 2002 |

(File containing generated Service Deployment call back class and method code.)

| FindMeManagement.java | 885 bytes | created Sep. 5, 2002 |

(File containing generated Service Management call back class and method code.)

| FindMeSbb.java | 4,053 bytes | created Sep. 5, 2002 |

(File containing generated stubs for the class containing the event handlers that service logic can be added to.)

| FindmeSbbProfileData.java | 2,186 bytes | created Sep. 5, 2002 |

(File containing generated code to access Service scope data).

| FindmeSubscriberProfileData.java | 3,691 bytes | created Sep. 5, 2002 |

(File containing generated code to access Subscriber scope data).

| JSDL.tcl | 16,689 bytes | created Sep. 3, 2002 |

(File containing utility code for code generation).

| JSDL.xml | 2,352 bytes | created Sep. 3, 2002 |

(File containing the service descriptor for standard JAIN SLEE service features).

| PhoneMap.java | 13,459 bytes | created Sep. 5, 2002 |

(File containing generated code that models Subscriber profile data as Java objects).

| TestProperty1Property.java | 3,556 bytes | created Sep. 5, 2002 |

(File containing generated code that models Subscriber profile data as Java objects).

| TSDL.tcl | 6,839 bytes | created Sep. 3, 2002 |

(File containing utility code for code generation).

| TSDL.xml | 1,467 bytes | created Sep. 3, 2002 |

(File containing the service descriptor for TrueConverge extended SLEE service features).

-continued

| TSDL.xsd | 17,654 bytes | created Sep. 5, 2002 |

(XML schema defining the grammar for TSDL.xml, which is the file that contains the service descriptor for TrueConverge, extended SLEE service features).

BACKGROUND OF THE INVENTION

The present invention relates to the field of software-based services in communication networks. More particularly, it includes systems and methods for maintaining and utilizing routing data to handle event notifications generated by call handling in a service logic execution environment.

A service is a software application that is installed in a communication network to provide value added functions to subscribers. Subscribers are users of the communication network who subscribe to the services. Services control the network to perform value-added functions for subscribers based on provisioned data and network conditions. Service instance is a single run time instance of the service that provides the service functions to a subscriber. A service may include one or more service instances, which may be operating in different modes to handle different phases of providing the service. Service Logic Execution Environment (SLEE) is the run time environment in which a service executes. A SLEE is a new approach to the long-standing issue of how to supplement switches with intelligent capabilities. Sun Microsystems, Inc. has sponsored development of telecommunications computing standards, so that service logic execution environments will have open, non-proprietary architectures. The so-called JAIN SLEE standard reached the stage of public comment on 12 Aug. 2002, having gone through drafts prior to that. A SLEE is intended to support multiple services and accept software written by multiple vendors in compliance with one or more telecommunications computing standards.

The JAIN SLEE standard leaves much to be filled in by the service developer. JAIN SLEE is essentially an application program interface (API) specification that does not specify the internal details of implementing services. JAIN SLEE specification is very generic in the definition of service and subscriber data. This provides a lot of flexibility but comes with a cost, as it places the burden on the service developers to provide the necessary Management interfaces. The standard does not provide any mechanism for the service developer to define the data schema for the service and subscriber data. Nor does it define any mechanism to provide sophisticated data provisioning and management. The complementary Java Management (JMX) standard is still evolving. In JAIN SLEE, Event Triggering is the primary mechanism to invoke services, which limits efficient use of the Services by other applications and clients that are not based on an event model, such as web based provisioning and statusing interfaces.

Traditionally, both before JAIN SLEE and even now, as the first public comment draft is being circulated, service execution platforms are being built to serve a single function on a proprietary platform, to deliver a single event or sequence the events from a single source to one service instance. Traditional platforms have associated a call or a sequence of events to a service instance and delivered all the events of that call or sequence to the same service instance. These special purpose platforms have worked well for stable services that support events from a single network. But special purpose platforms have proven cumbersome and expensive to modify and difficult for a support staff to integrate and maintain.

Services include two important components—service logic and service data. Service data may have both service scope data, which is the data that is common across the service, and subscriber scope data, which the data specific to a subscriber related to the service. A service execution environment like a SLEE benefits from support for persisting the data, provisioning the data, and exposing the data to services during runtime. Existing proprietary platforms support the service data by typically defining it using some method specific to the underlying database system of the platform—a proprietary language or a more generic language like SQL. Service developers typically also have to develop interfaces to provision this data along with the services. During execution, the services access the data using some proprietary programming interface or a more generic interface like JDBC. The problems with these platforms are multifold, including lack of compliance with JAIN SLEE or any similar telecommunications computing standard. First, the service developers need to understand the platform design to be able to develop data provisioning interfaces and have to manage their own data persistence by accessing and updating it using some programming interface. Second, the service data definition on proprietary platforms is so closely tied to the platform data that the platform has to restrict the power/functionality of service data definition, or require it to be statically defined before platform installation, so the proper analysis of its impact on the platform and other service on the platform can be done. This makes it hard to dynamically deploy a new service. Third, the service developers have to concern themselves with the underlying details of the platform database and user interfaces rather than just focusing on what the service does.

Services are typically triggered by events, requests or messages (we shall use the terms event and event notification to refer to all of them) originating in the call processing system and other external systems, and some of the service execution platform provided services as well. Addresses are the identifiers that typically identify the subscribers associated with the events by points of call origination, destination or both. Addresses also may identify participants in a service other than the subscriber.

With the development and improved capabilities of wireless communications and the Internet, more and more services are being offered on multiple networks. For example, a simple voice service could serve subscribers whose calls originate from a land based telephone network, a wireless telephone network, and an the Internet connection. Similarly, a text-based chat room could serve subscribers calling in from a public telephone, using a web browser over the internet, sending/receiving Short Messages from a wireless phone, and sending/receiving email from a distribution list. Enhanced services for subscribers from multiple networks are so-called converged services.

Accordingly, there is an opportunity to provide software components compliant with a telecommunications computing standard for a service logic execution environment, such as the emerging JAIN SLEE standard or a subsequent standard. In this new environment designed to support multiple types of service and multiple vendors, many components need to be developed to support development and execution of new services. For instance, there is an opportunity to provide methods and devices that assist service developers in specifying their service definition and requirements for the service data. In addition, it is useful to support services with component operable in the service logic execution environment that support data persistence and access, with minimal development effort by service developer.

SUMMARY OF THE INVENTION

The present invention relates to the field of software-based services in communication networks. More particularly, it includes systems and methods for maintaining and utilizing routing data to handle event notifications generated by call handling in a service logic execution environment. Particular aspects of the present invention are described in the claims, specification and drawings.

BRIEF DESCRIPTION OF THE FIGURES

FIG. 7 is a graphical user interface that collects event information.

FIG. 20 is a graphical interface for defining a service table.

FIG. 21 is a graphical interface for defining attribute details.

DETAILED DESCRIPTION

Figure 1:
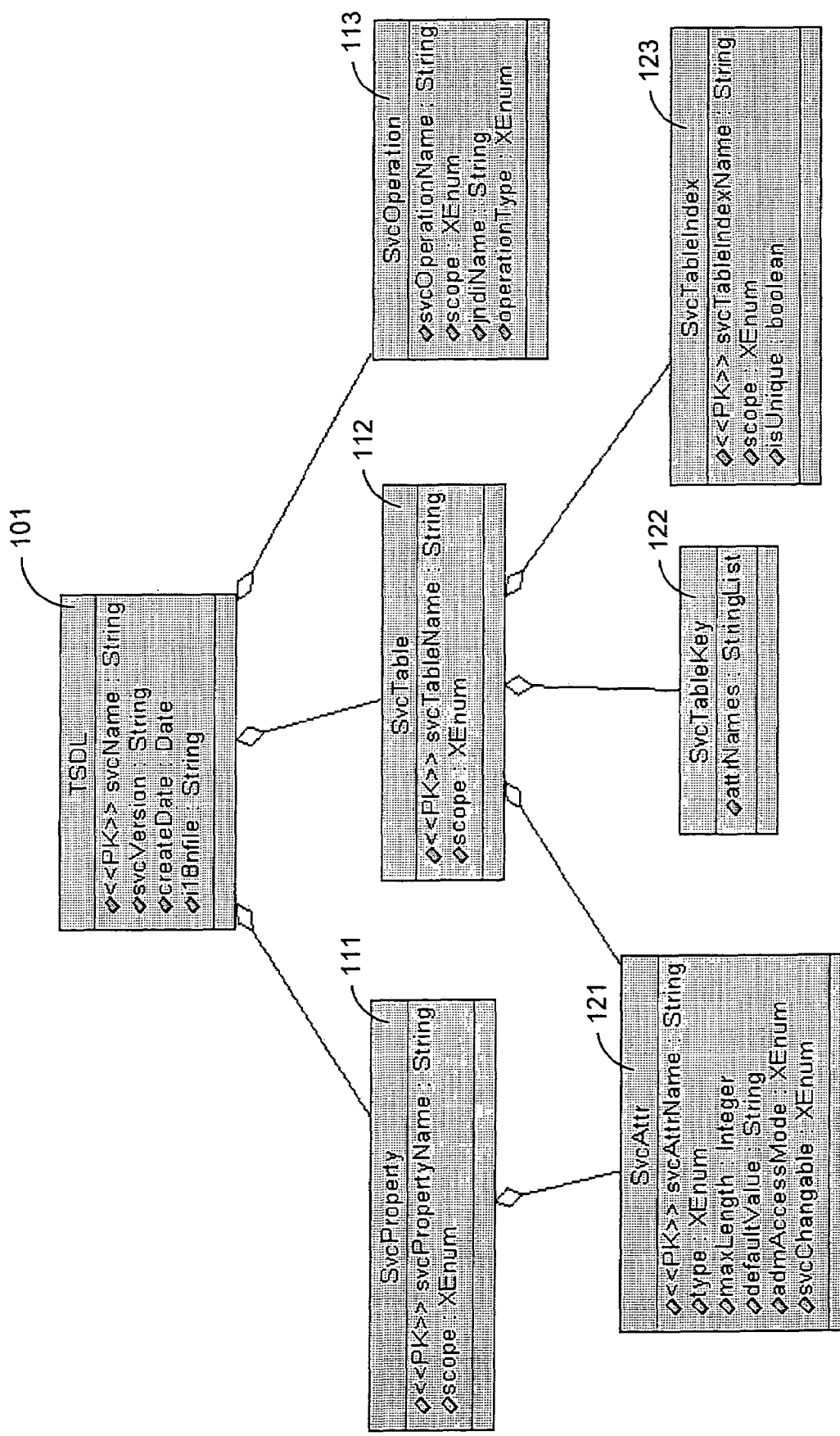
FIG. 1 is an object view of the TSDL schema

The following detailed description is made with reference to the figures. Preferred embodiments are described to illustrate the present invention, not to limit its scope, which is defined by the claims. Those of ordinary skill in the art will recognize a variety of equivalent variations on the description that follows.

Service developers can define service data information in XML service deployment descriptors using the TrueConverge™ Service Description Language (TSDL). Service deployment descriptors are XML files created by the service developers to define various service related data that can be used for code generation and to control deployment of the service. In one embodiment, a SLEE supports two different descriptors. One description is a required JSDL (JAIN SLEE Service Description Language) descriptor compliant with the definition of the service DTD in the JAIN SLEE specification. By compliant, we mean compatible with draft or public comment versions of the JAIN SLEE standard or subsequent versions or adaptations of the standard. Compatibility, in this sense, does not require a complete implementation of the standard. One of skill in the art will recognize that the present invention applies as well to subsequently-developed telecommunications computing standards that may supplement or supplant JAIN SLEE. The other descriptor is an optional TSDL file containing information that extends JAIN SLEE for service data definition, provisioning, convergence control, routing, internationalisation/localization, and component packaging. An XML schema for TSDL is included in the CDRom Appendix file TSDL.xsd. In the service descriptor definition phase in addition to the event description, the user describes the data model, deployment properties etc. in the XML format using the JSDL and TSDL, optionally using a graphical interface. While the JAIN SLEE specification defines the service descriptor using an XML DTD (Document Type Description) format, it also can be defined using an XSD (XML Schema Definition) to provide additional checks and validation. This difference in XML schema definition languages should be transparent to the service developers.

The information that can be specified in TSDL includes: (1) service name, version, and creation date; (2) basic data entities called service attributes; and (3) for each service attribute: (a) whether it is a required attribute; (b) whether it is automatically generated; (c) a default value of the attribute; (d) a type for the attribute, from a predefined set of types; (e) valid values of the attribute; and (f) user interface properties for display and searchability. The information further includes: (4) two types of service data entities both composed of service attributes: (a) service properties, which are complex entities made of 1 or more service attributes; and (b) service tables, which are complex entities containing multiple records, where each record is made of 1 or more service attributes. Service properties may include a (a)(i) scope, such as a subscriber scope or service scope; (ii) optional foreign keys that are composed of 1 or more attributes of the property; (iii) access modes for data to read, write, update, delete for service, subscriber and administrator levels; and (iv) optional validation rules. Service tables may include a (b)(i) scope of the table, such as a subscriber scope or service global scope; (ii) a service key, which is composed of 1 or more attributes of the record; (iii) optional foreign keys, which are also composed of 1 or more attributes of the record; (iv) an optional container table which is a parent of the service table; (v) optional indexes used to guide the platform for storage and retrieval efficiencies; (vi) access modes for data to read, write, update, delete for service, subscriber and administrator levels; (vii) optional validation rules for data. Validation rules for service properties or service tables may include data range, length and regular expression based rules, value and existence based rules, and property, table, and record level rules, including inter entity and intra-entity validations.

Service developers further can use TSDL to define internationalization/localization options, through the definition of an internationalization file that contains data to internationalize user interface, display items and error messages. Custom options supported include validation by callback methods, to allow service developers to perform their own validation, and adoption of user interface, both automatically generated and user supplied optional user interface components, to allow service developers to provide their own user interface. The TSDL schema in TSDL.xsd illustrates how the present invention can support these service development features. Corresponding to the schema, FIG. 1 provides an object-oriented view of aspects of TSDL. Entity TSDL 101 includes basic information such as service name, version, creation date and an internationalization file string. A plurality of service properties 111 may be associated with TSDL 101. A service property may have a name and an enumerated scope. A plurality of service tables 112 also may be associated with TSDL 101. A service table may have a name and an enumerated scope. A plurality of service attributes 121 may be associated with either a service property 111 or a service table 112. A service attribute may have a name, an enumerated type, an access mode and a changeable status. It also may have a maximum length and a default value. A plurality of service table keys 122 may be associated with a service table 112. A plurality of service table indexes 123 also may be associated with a service table 112.

In operation, the SLEE platform, here inclusive of development software supporting the SLEE run-time environment, parses the provided service TSDL information, validates it against the TSDL definition, and builds service meta data. In one embodiment, this service meta data includes a Java representation of the service description information.

During service development, the SLEE platform uses the service meta data, and predefined templates to generate programming objects in a language such as Java or C++ that correspond to the defined service properties and service tables. These objects contain access methods that can be directly used by service developers to access and persist the service data in a database, without having to use any database specific interfaces.

During service installation, the SLEE platform (including development software) can use the service meta data to construct a physical data model, supporting the service. It maps the service tables and properties into tables in a database, preferably a relational database. It maps the attributes into column of the database tables, and maps the attribute types into the column types. It maps the table keys, foreign keys, indexes, container tables into appropriate database entities. It may generate supporting database entities like views, indexes, sequences, stored procedure to support things like access, auto generation and validation. It may generate data definition language (e.g., SQL) for the underlying database management system. It may use service priority and other service related information to allocate appropriate resources for service related entities. It may create and initialize all the generated database entities by executing the Data Definition Language through an underlying database system.

After service installation, the SLEE platform uses the metadata and templates corresponding to different network types, such as HTML, WML, VXML templates, to generate components such as: HTML-based Java server pages (JSPs)

that provide user interfaces for the service administrators to provision and manage the service data and HTML, WML and/or VXML based Java server pages that provide user interfaces for direct provisioning of subscriber scope service data by the subscriber. These Java server pages generate the appropriate interfaces in the respective markup language during actual interaction with the users. Other technologies for generating pages, such as XSLT or even static pages, can alternatively be used.

A simple example is useful, before an extended description. Consider a simple service called "FindMe", which enables a subscriber to specify a list of telephone numbers (also referred to as addresses) and a voicemail number. The service implements the following logic: If any of the numbers belonging to the subscriber receive a call, all the numbers ring until one of them is answered. If the there is no answer on any numbers for a certain period of time, the call is directed to the voice mail. Aspects of the present invention collect a service data description, and then generate Java objects, physical data model, and provisioning interfaces. For this example, the underlying network provides a JCC API for the service. To be able to implement the behavior described, the FindMe service needs to be notified when there is an incoming call to a subscribed address, when the subscriber answers one of the configured addresses, and when one of the configured addresses is busy.

In a JAIN SLEE embodiment, the following FindMe events corresponding to JCC events: JccConnectionEvent.CONNECTION_ALERTING—This is the initial event on which the service will be invoked. This event will invoke the FindMe service when the subscriber's address is being notified of an incoming call. JccConnectionEvent.CONNECTION_CONNECTED—This event indicates that the subscriber has answered on the connection on which it occurs. JccConnectionEvent.CONNECTION_FAILED—This event is received indicating a busy connection, if any of the connections are busy.

The FindMe service, in this example, defines event handlers for these three events. onConnectionAlerting()—Handles the CONNECTION_ALERTING event, and sets up connection attempts to all the provisioned addresses on the subscriber's list. onConnectionConnected()—Handles the CONNECTION_CONNECTED event, which indicates that one of the connection attempts resulted in a successful connection. The logic then completes the connection process for that attempt and releases all other attempts. onConnectionFailed()—Handles the CONNECTION_FAILED event, which indicates that one of the connection attempts resulted in a busy connection. The logic then terminates all the connections and forwards the call to the voice mail address.

This service example does not need any service level data. However, each subscriber needs to provide a list of phone numbers to find and a default voicemail number. The data model for the service will contain: a subscriber scope PhoneList containing a list of phone numbers and a subscriber scope voicemail phone number.

The service descriptor definition may include events, event handlers, data model, and the other information in the JSDL and TSDL descriptors. The JSDL part of the service descriptor definition may include service information, service classes and event entries. The service information part of JSDL contains information to uniquely identify the service like name, vendor, version, and description. For the FindMe service, we provide the following information:

Service Name: findme

Service Vendor: TrueTel Communications

Service Version: 1.0

Service Description: For incoming calls "Finds" the Subscriber at one of the multiple configured addresses.

An XML fragment that corresponds to this information follows:

```
<service-info>
<description> For incoming calls Finds the Subscriber at one of the multiple configured addresses.</description>
    <service-name>findme</service-name>
    <service-vendor>TrueTel Communications</service-vendor>
    <service-version>1.0</service-version>
. . .
```

This fragment and others that follow are part of the overall JSDL file "JSDL.xml" that is included in the CDRom appendix.

The service classes part of the JSDL contains information about various service classes that the service developer provides or expects SLEE to generate so that they can be used in the code. For the FindMe service, we provide the following information:

Service Class: com.truetel.svc.findme.FindMeSbb

Service Profile: com.truetel.svc.findme.FindmeSbbProfileData

Subscriber Profile: com.truetel.svc.findme.FindmeSubscriberProfileData

An XML fragment that corresponds to this information follows:

```
<service-classes>
    <service-class>
        <abstract-class-name>com.truetel.svc.findme.FindMeSbb</abstract-class-name>
    </service-class>
    <service-profile>
        <profile-ro-class>com.truetel.svc.findme.FindmeSbbProfileData</profile-ro-class>
        <jmx-manager>null/jmx-manager>
    </service-profile>
    <subscriber-profile>
        <profile-ro-
```

```
class>com.truetel.svc.findme.FindmeSubscriberProfileData</profile-ro-class>
            <jmx-manager>null</jmx-manager>
        </subscriber-profile>
    </service-classes>
```

The event entries part of the JSDL contains information about various events that the service handles or generates. For this service, we define the details of the three events identified in the service definition. CONNECTION ALERTING event is identified as Initial and the all three events are of "listening" type for the service. We also define the priority although is it largely irrelevant for a single service case. We also define the respective event handlers to be defined in the service class FindMeSbb to handle these events. For the CONNECTION ALERTING event:
Type: Listen
Priority: 3
Initial: True
Event ID: jain.application.services.jcp.JcpConnectionEvent.CONNECTION_ALERTING
Event Class: jain.application.services.jcc.JcpConnectionEvent
Event Handler: onConnectionAlerting()

For the CONNECTION CONNECTED event:
Type: Listen
Priority: 2
Initial: False
Event ID: jain.application.services.jcp.JcpConnectionEvent.CONNECTION_CONNECTED
Event Class: jain.application.services.jcc.JcpConnectionEvent
Event Handler: onConnectionConnected()

For the CONNECTION FAILED Event:
Type: Listen
Priority: 1
Initial: False
Event ID: jain.application.services.jcp.JcpConnectionEvent.CONNECTION_FAILED
Event Class: jain.application.services.jcc.JcpConnectionEvent
Event Handler: onConnectionFailed()

An XML fragment that corresponds to this information follows:

```
<event-entry type="Listen" custom="true" priority="3" initial="true">
    <event-id>jain.application.services.jcp.JcpConnectionEvent.CONNECTION_ALERTING</event-id>
    <event-class>jain.application.services.jcc.JccConnectionEvent</event-class>
    <event-handler>onConnectionAlerting</event-handler>
</event-entry>
<event-entry type="Listen" custom="true" priority="2" initial="false">
    <event-id>jain.application.services.jcp.JcpConnectionEvent.CONNECTION_CONNECTED</event-id>
    <event-class>jain.application.services.jcc.JccConnectionEvent</event-class>
    <event-handler>onConnectionConnected</event-handler>
</event-entry>
<event-entry type="Listen" custom="true" priority="1" initial="false">
    <event-id>jain.application.services.jcp.JcpConnectionEvent.CONNECTION_FAILED</event-id>
    <event-class>jain.application.servicesjcc.JccConnectionEvent</event-class>
    <event-handler>onConnectionFailed</event-handler>
</event-entry>
```

The service information part of TSDL contains some of the same information on the service as the JSDL. In addition, it also contains the i18nfile for internationalization of various strings for display in the provisioning interfaces. For the FindMe service, we provide the following information:
Service Name: findme
Service Version: 1.0
i18nfile: com.truetel.svc.findme.properties.FindMeI18N An XML fragment that corresponds to this information follows:

```
<TSDL xmlns:xsi="http://www.w3.org/2001/XMLSchema-instance"
    xsi:noNamespaceSchemaLocation="TSDL.xsd" svcName="findme"
    svcVersion="1.0" i18nfile="com.truetel.svc.findme.properties.Find
    MeI18N" createDate="2001-07-05">
    . . .
</TSDL>
```

The TSDL version of the service data description, set forth below, can be used by the service developer to specify aspects of the service. The example below includes a subscriber scope service table called AddrList, with attributes AddrId and AddrStr; a subscriber scope service property called VoiceMail, with attribute VoiceMailAddress; and a service scope service property called TimeOut, with attribute Duration. Subscriber scope means that the data in the table is on a per subscriber basis and the subscriber is implicitly part of the key. AddrList table contains the list of phone numbers to "Find" the subscriber when an incoming call arrives. This simple table contains service attribute called AddrStr, which is of the type "String" with a maximum length of 10. A service property is service or subscriber scope data that contains one or more attributes. These attributes have only one value in the service or subscriber scope. For our FindMe service, we define a subscriber scope service property called VoiceMail containing a single service attribute called voiceMailAddress, which is of the type "string".

```xml
<?xml version="1.0" encoding="UTF-8"?>
<TSDL xmlns:xsi="http://www.w3.org/2001/XMLSchema-instance"
xsi:noNamespaceSchemaLocation="TSDL.xsd" svcName="FindMe"
svcVersion="1.0">
    <SvcTable admAccessMode="none" scope="subscriber"
subscriberAccessMode="none" svcAccessMode="none"
svcTableName="AddrList">
        <SvcAttr admAccessMode="rw" isRequired="true"
isSvcChangeable="false" subscriberAccessMode="none" svcAttrName=
"AddrId"svcEnumName="" type="Short"/>
        <SvcAttr admAccessMode="rw" isRequired="true"
isSvcChangeable="false" maxLength="10" subscriberAccessMode=
"none"svcAttrName="AddrStr" svcEnumName="" type="String"/>
        <SvcTableKey>
            <AttrName>AddrId</AttrName>
        </SvcTableKey>
    </SvcTable>
    <SvcProperty scope="subscriber" svcPropertyName="VoiceMail">
        <SvcAttr admAccessMode="rw" isRequired="true"
isSvcChangeable="false" subscriberAccessMode="none"
svcAttrName="VoiceMailAddress" svcEnumName="" type="String"/>
    </SvcProperty>
    <SvcProperty scope="svc-global" svcPropertyName="TimeOut">
        <SvcAttr admAccessMode="none" isRequired="true"
isSvcChangeable="false" subscriberAccessMode="none"
svcAttrName="Duration" svcEnumName="" type="Short"/>
    </SvcProperty>
</TSDL>
```

This XML fragment is part of the file TSDL.xml in the CDRom appendix.

In the fragment above, the use of data types is illustrated. Supported data types include Enum, Integer, Long, Short, String, Boolean, Timestamp, DigitString and FileName. Not all of these data types will be required for every application. Additional data types can readily be supported by extension of the TSDL schema. The following table shows you how SLEE maps the service attribute type into internal Database types, and the Java class that it returns when accessed using the accessor methods.

| type | Database Type | Java Class |
|---|---|---|
| Integer | NUMBER (10) | Integer |
| Long | NUMBER (20) | Long |
| Short | NUMBER (5) | Short |
| Enum | NUMBER (3) | SvcEnum Value class |
| String | VARCHAR2 | String |
| Timestamp | DATE | Timestamp |
| Boolean | NUMBER (1) | Boolean |
| DigitString | VARCHAR2 | String |
| FileName | VARCHAR2 | String |

For the service attributes of type string, maxLength should be specified, or maxLength may default to the maximum allowed length of the string on the system. For the service attributes of type Enum, the svcEnumName should be specified to identify the Enum that is defined elsewhere in the TSDL. A required attribute is specified by setting the isRequired attribute of the Service Attribute to true. The default value of isRequired is false.

Default value of an attribute can be specified in the defaultValue attribute. The attributes admAccessMode and subscriberAccessMode specify the access mode of the attribute by the Administrator and the Subscriber respectively. The following lists the various permitted modes. Note that change access allows modification of existing attributes but does not allow creating them, whereas write provides both. Other accesses include none, which provides no access, ro for read only access, rc read and create access, and rw for read, create, and write access.

TSDL also may contain information on service implementation extensions supported by the SLEE platform. For the FindMe service, we provide the following data: globalSIMode and subscriberSIMode—these control the service convergence, and we set them to none and manyPerSubscriber. svcEventRouting—this provides the class implementing callback functions to identify subscriber address from the incoming events. We set this to com.truetel.svc.findme. AddrType—this provides the type of subscriber addresses that this service can serve. For Findme this will be a telephone number, so we set this to PhoneNo.

Programming objects also can be generated by the SLEE, including programming objects for the public interface to the data. These objects can be used in the service code to access the data from the underlying platform database. For example, for the subscriber scope service table "AddrList":

```
public class AddrList {
    AddrList (Short AddrId, String subscriberName);
    public Short getAddrId( );
    public void setAddrId(Short AddrId);
    public String getAddrStr( );
    public void setAddrStr(String AddrStr);
    public void revert( );
    public void retrieve( );
    public void commit( );
}
```

For the subscriber scope service property "VoiceMail":

```
public class VoiceMail{
    VoiceMailProperty (String subscriberName);
    public String getVoiceMailAddress( );
    public void setVoiceMailAddress(String VoiceMailAddress);
    public void revert( );
    public void retreive( );
    public void commit( );
}
```

For service scope service property "TimeOut":

```
public class TimeOut{
    TimeOutProperty ( );
    public Short getDuration( );
    public void setDuration(Short Duration);
    public void revert( );
```

```
        public void retreive( );
        public void commit( );
}
```

These object classes support the service developer's efforts to create a service. The system also may generate wrapper objects for these data objects to group all the service scope data and subscriber scope data.

The following illustrates database tables, columns and column types, and keys that can be automatically created in the platform database for the FindMe service. This is the physical data model corresponding to the specification. The SERVICEOID and SUBSCRIBEROID are platforms representation of the service and subscriber data that the scope of the data is related to. For the service scope service property FINDME_TIMEOUT:

| Column Name | Key? | Type |
|---|---|---|
| SERVICEOID | Yes | NUMBER(20) |
| DURATION | | NUMBER(5) |

For the subscriber scope service property FINDME_VOICEMAIL:

| Column Name | Key? | Type |
|---|---|---|
| SUBSCRIBEROID | Yes | NUMBER(20) |
| VOICEMAILADDRESS | | VARCHAR2(32) |

For the subscriber scope service table FINDME_ADDRLIST:

| Column Name | Key? | Type |
|---|---|---|
| SUBSCRIBEROID | Yes | NUMBER(20) |
| ADDRID | Yes | NUMBER(5) |
| ADDRSTR | | VARCHAR2(10) |

Figure 2A:
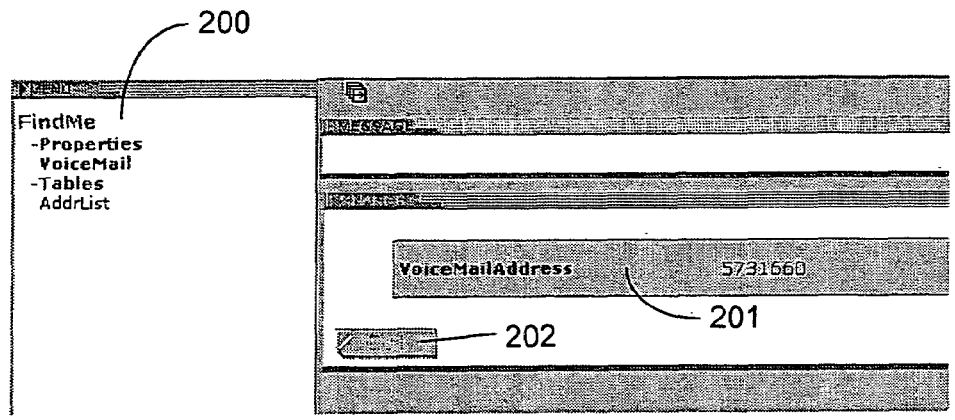
FIGS. 2A and 2B show user interfaces generated for subscriber scope data access.
Figure 2B:
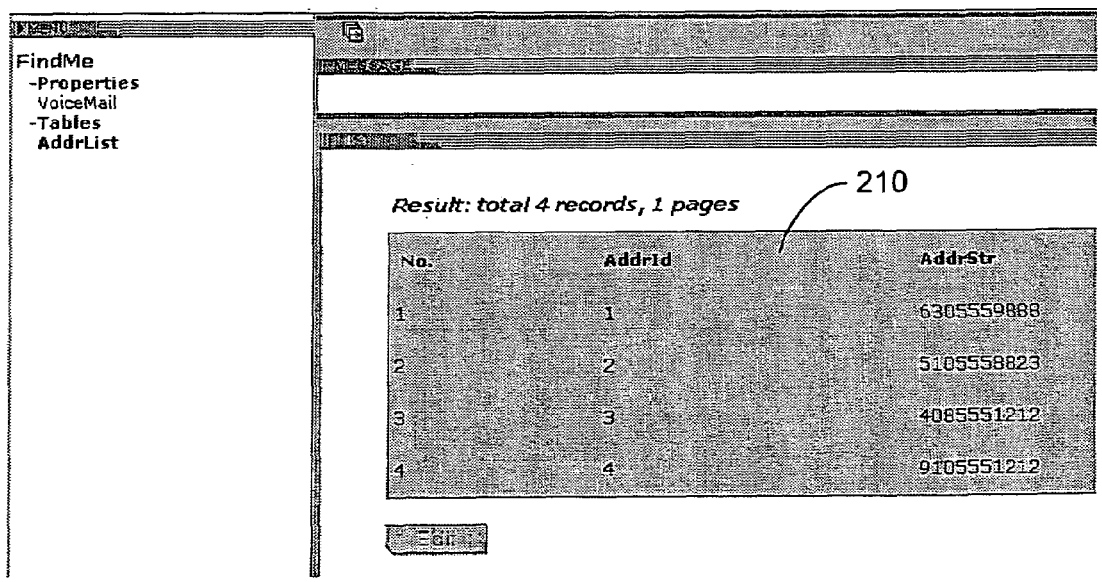

The system also may generate provisioning interfaces, such as HTML pages for browsers. FIGS. 2A and 2B show user interfaces that SLEE can generate for the subscriber scope data access for the FindMe service. The list column 200 indicates the properties and tables available through the interface. FIG. 2A provides access to the property VoiceMailAddress 201, which may be edited by selecting-the edit button 202. In some interfaces, the edit button will invoke a further interface organized for entry of detailed information. FIG. 2B provides access to the table AddrList 210 and the attributes AddrId and AddrStr. The numbers at which the subscriber should be called are entered as AddrStr attributes. The interfaces in these figures are automatically generated from the service description and can be accessed by the users through a web browser. Similar interfaces may be generated for the service scope data as well, when a service requires service scope data. SLEE may generate interfaces in the WML and VXML formats as well, for the subscriber scope data.

A service creation environment supports (SCE) collection of data, translation of the data into a machine readable specification such as TSDL and automatic generation of useful software components to support service generation. Much of the behavior of the SCE can be recognized from its graphical user interface, aspects of which are depicted in FIGS. 3 through 27.

Figures 3, 4:
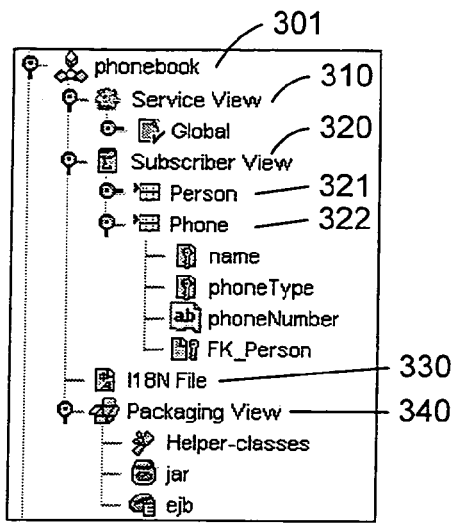
FIG. 3 is a tree that organizes information collected through the user interface.
FIG. 4 is a graphical user interface that collects service information categorized as basic information, other information and a description.

FIG. 3 is a tree that organizes information collected through the user interface. Information pertaining to a service may be categorized as JSDL information, TSDL information, I18N information, and packaging data. The hierarchical tree view shown in FIG. 3 supports this organization. A service node 301 acts as a root node and provides the views for manipulating service details as per JSDL and TSDL specifications. A Service-View 310 and a Subscriber-View 320 contain database related information as specified by TSDL. The difference between these two views is that the Service-View maintains the elements of service global scope whereas the Subscriber-View maintains the subscriber scope elements. In this example, the subscriber view includes service tables person 321 and phone 322. The I18N view 330 allows user to create and specify the service attributes according to different locales. The Packaging View 340 keeps track of all the classes, EJBs and Jars related to the service.

FIG. 4 is a graphical user interface that collects service information categorized as basic information 410, other information 420 and a description 430. This interface is accessed via the info tab 401. In particular, this embodiment of the user interface collects Name, which is a service name. Though, JSDL does not enforce a name length, TSDL restricts name to not more than 10 characters. Vendor is the name of the vendor of the service, which may be the service developer. Version identifies the current version of the service. Create Date specifies the service creation date. In this example, the date is in YYYY-MM-DD format. This format may be configurable. To change date, click Calendar and specify the date. Icon File Name is a path to a service icon that will be used for showing the service. This may be an absolute path or may be relative to a base location entered elsewhere. Session Timeout is the total time interval, in milliseconds, to wait for a response from the service logic after it hands over the event to SLEE. Max Exceptions Allowed is the maximum number of exceptions to be handled by SLEE for the current service. Description is a text description for the service. Among these fields, Name, Version, Vendor should be mandatory. Fields such as, Create Date and Icon File Name are part of TSDL data, which may be optional.

Figure 5:
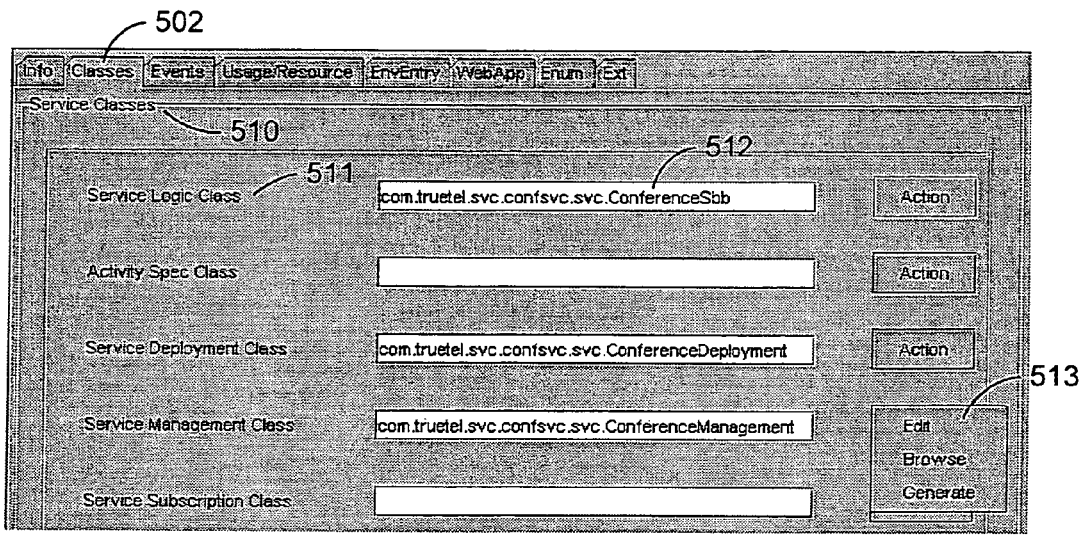
FIG. 5 is a graphical user interface that collects identifiers of service classes.

FIG. 5 is a graphical user interface that collects identifiers of service classes 510. This interface is accessed via the classes tab 502. In particular, this embodiment of the user interface presents classes 511 that are specified by JSDL or by TSDL or typically used by service developers and collects class names 512 specified by the user. Alternatively, this data can be imported from elsewhere and edited using the interface. In addition to the classes shown in the figure, this interface also may support the classes Service Event Routing Class, Service Provisioning Class, Service Profile Data Class and Subscriber Profile Data Class. It further may support any of the classes identified in the CDRom appendix. Service Logic Class is the abstract class name for the service logic. Activity Spec Class is the interface for the activity context of the service. Service Deployment Class is the deployment class for the service. Service Management Class is the service management class. Service Subscription Class is the service subscription class. Service Event Routing Class and Service Provisioning Class are the service extension implementation classes used for specifying event routing and service provisioning respectively. Service Profile Data Class and Subscriber Profile Data Class are read only profile classes for service and subscriber respectively. Class names provided should be fully qualified names. The Action button 513 offers the user choices of editing the class, browsing it, or generating code for the class. Edit opens a Java source for the corresponding class in an editor. Browse is used to specify a class name from a list or tree. A selected class file entry will be parsed to generate a fully qualified name. Generate will generate the specified class in a predetermined or selected folder.

Figure 6:
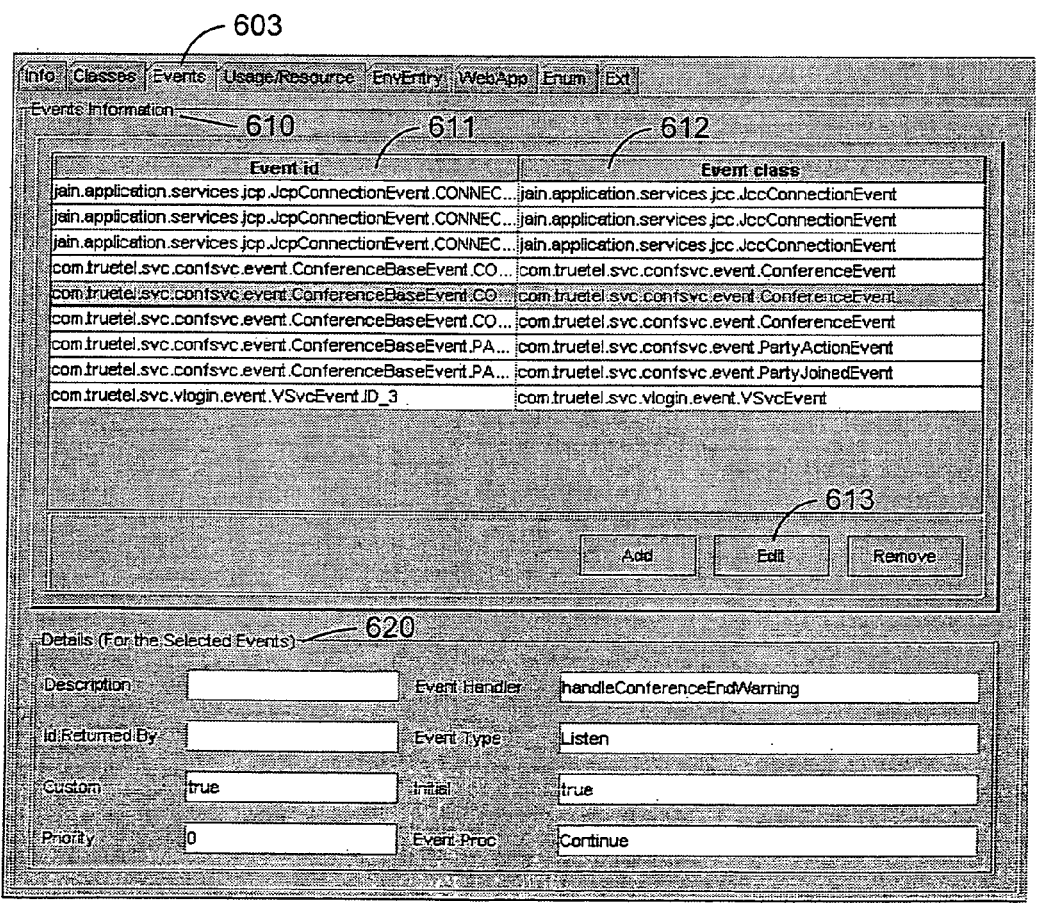
FIGS. 6 and 7 are graphical user interfaces that collect event information.

FIG. 6 is a graphical user interface that collects event information 610, including event ids 611, event classes 612 and detailed information 620. This interface is accessed via the events tab 603. The edit button 613 of this interface is linked to an additional detailed entry screen or wizard shown in FIG. 7.

Figure 7:
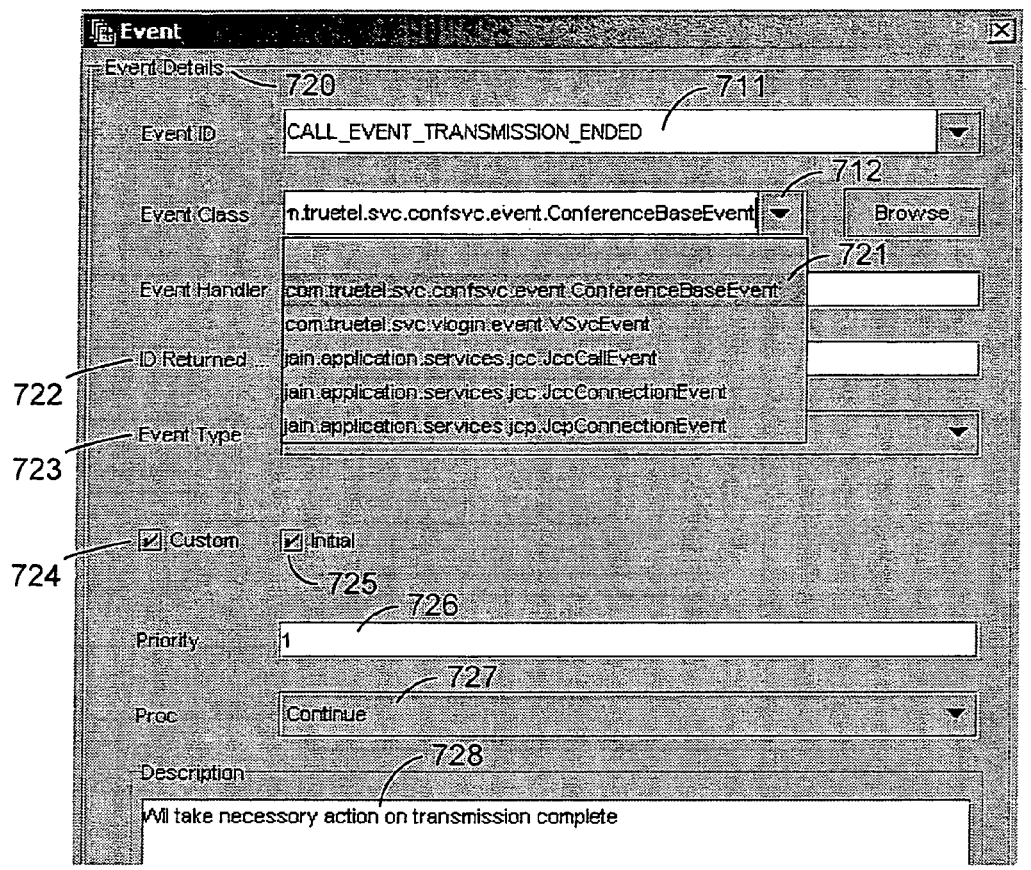

The event details 720 collected in FIG. 7 include Event id 711, which is a static constant defined in Event Class. For example, from "jain.application.services.jcc. JccConnectionEvent" event class, the Event id can be "CONNECTION_ALERTING". Event Class 712 is a fully qualified Event Class Name. Event Handler 721 is a method defined in event listener that handles the event when it is invoked. Id Returned Type 722 provides a pick list of possible values that can be accepted as Event Types. Event Type 723 is either Listen or Fire. Priority 726 is the priority of the service for the event, for instance in the range 0 to 255, inclusive. Proc 727 provides a pick list for specifying that event processing is either to continue or be suspended. If the event is suspended, the dispatcher will only pass the event to one service at a time. Description 728 is a text description for the event. The check box Custom 724 is checked when the event is user defined. The check box Initial 725 is checked when association of the event with an existing activity will be enabled. Among these entries, Event id, Event Class, Priority should be mandatory information. At least one event is required in a service. Click the event shown in the table to view its details. To add an event, click Add.

Figure 8:
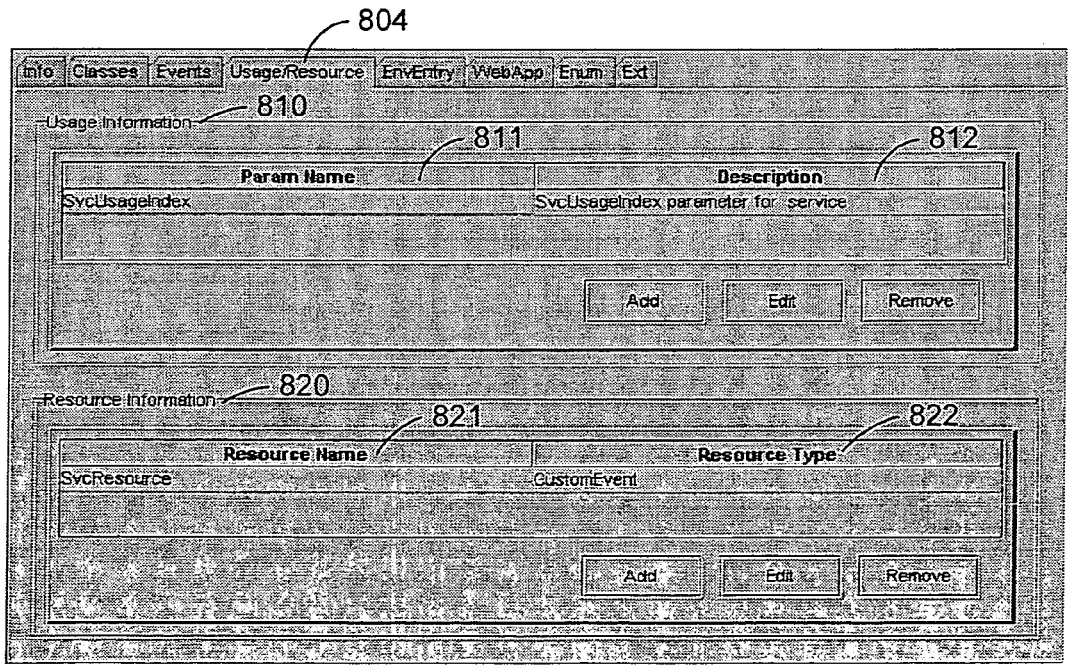
FIG. 8 is a graphical user interface that allows identification of usage information and resource information.

FIG. 8 is a graphical user interface that allows identification of usage information 810 and resource information 820 that the service should collect during operation. This interface is accessed via the usage/resource tab 804. In particular, this embodiment of the user interface allows identification of one or more parameter names 811 and descriptions of the parameters 812 and identification of one or more resource names 821 and resource types 822. For usage parameters, Param Name is a name of the parameter, which should match the string that the service passes when it invokes methods that track usage. Description is a text description for the parameter. Resource Information contains a declaration of a service's reference to an external resource. Resource Name is a name of a resource manager connection-factory reference. Resource Type is a type of resource data source. The type may be specified by the Java interface or class expected to be implemented by the data source. Description is a text description for the resource. Click Edit to specify/view description.

Figure 9:
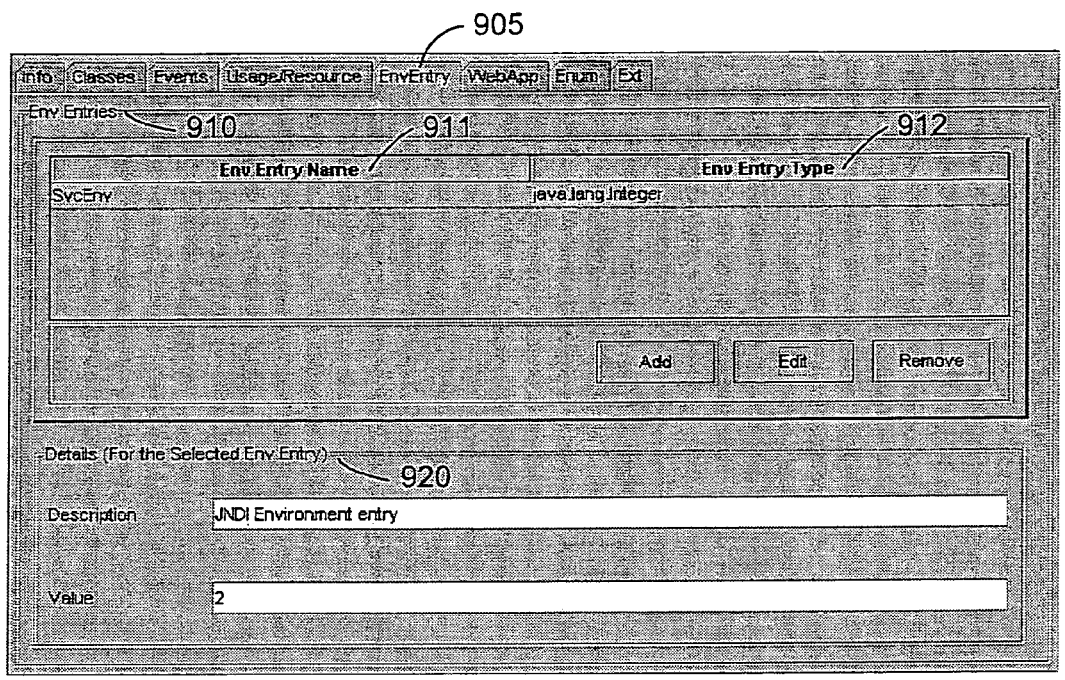
FIG. 9 is a graphical user interface that collects JNDI Environment Entries.

FIG. 9 is a graphical user interface that collects JNDI Environment Entries 910, including entry names 911, entry types 912 and detailed information 920. This interface is accessed via the EnvEntry tab 905. Env Entry Name is a name of an application's environment entry. Env Entry Type is a fully qualified Java type of the environment entry value that is expected by the application code. Description is a text description for the environment-entry. Value is the value of an application's environment-entry. Much of the information is optionally collected through the interfaces of FIGS. 4 through 9 is called for by a version of the JAIN SLEE standard.

Figure 10:
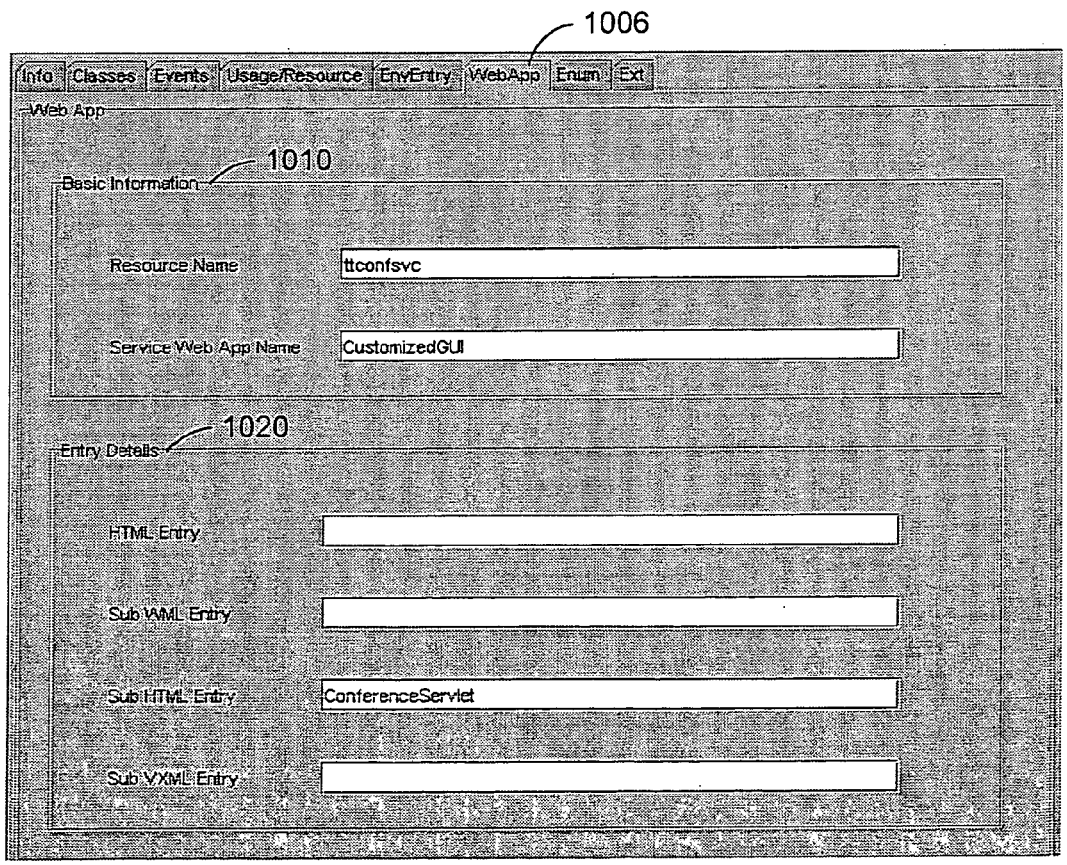
FIG. 10 is a graphical user interface that collects web application related data.

TSDL related information optionally may be specified using the interfaces in FIGS. 10 through 26. FIG. 10 is a graphical user interface that collects web application related data 1010, including basic information 1010 and entry details 1020. This interface is accessed via the WebApp tab 1006. Resource Name is a name of the resource the service refers to. Service Web App Name is a name of the service that will be displayed in the web application. The user can also specify entry details 1020 including HTML Entry, Sub WML Entry, Sub HTML Entry, and Sub VXML Entry, as specified in the TSDL schema. An entry should have a corresponding Resource Name and Service Web App Name.

Figure 11:
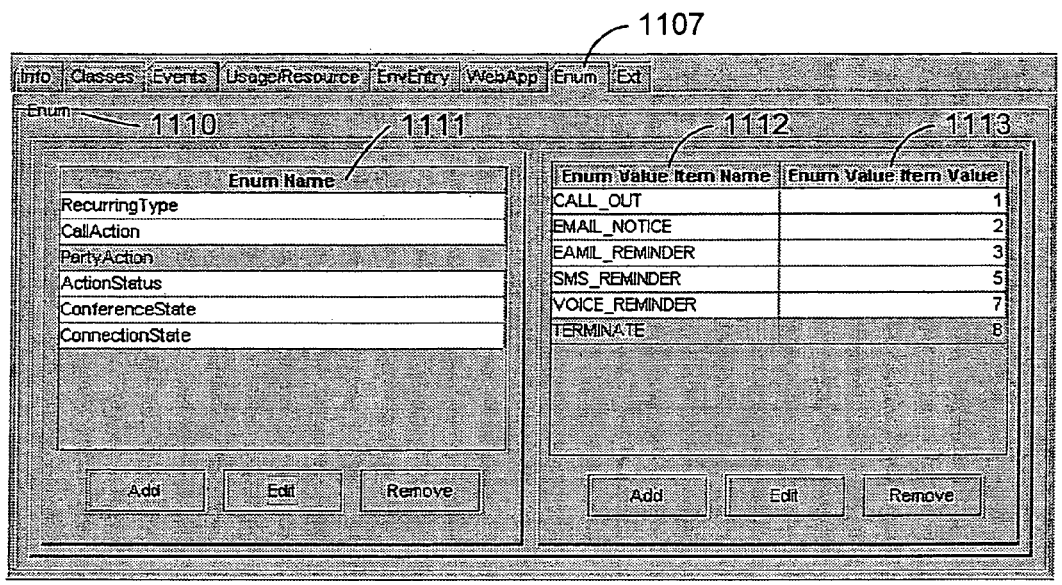
FIG. 11 is a graphical user interface for specifying enumerations.

FIG. 11 is a graphical user interface for specifying enumerations 1110 that allow a service developer to specify the possible values of a variable with meaningful symbolic names. It is accessed via the Enum tab 1107. A named enumerator 1111 has a list of enumerated names 1112 and values 1113 corresponding to the names.

Figure 12:
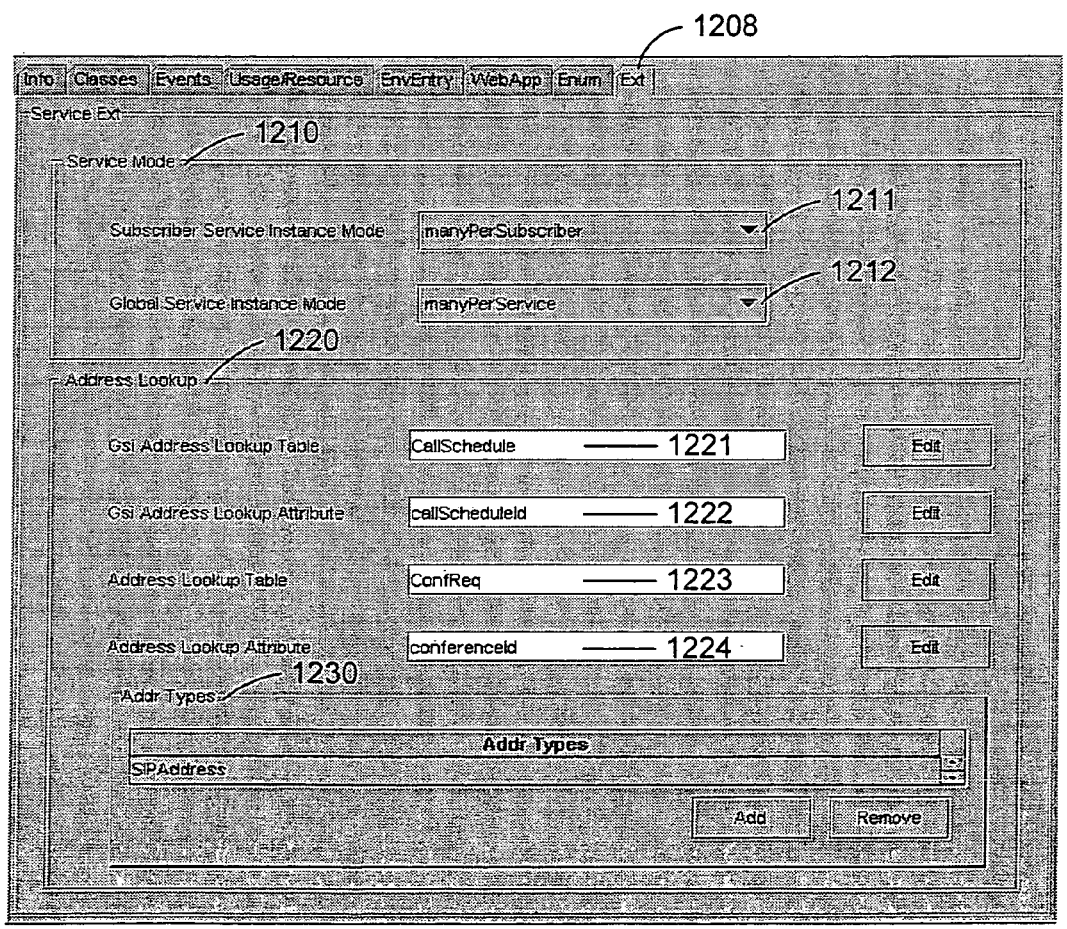
FIG. 12 is a graphical user interface that collects service mode and adds lookup information.

FIG. 12 is a graphical user interface that collects service mode 1210 and adds lookup 1220 information. It is accessed via the ext tab 1208. SCE allows specifying the Global Service Instance (GSI) mode 1211 and Subscriber Service Instance (SSI) mode 1212 information used for handling incoming events. Moreover, associated subscriber information can also be specified by Address Lookup 1220 mechanism. Subscriber Service Instance Mode 1211 specifies the mode of controlling the subscriber scope of service logic. The supported modes are manyPerSubscriber, onePerSubscriber, manyPerAddress, onePerAddress, and none. Global Service Instance Mode 1212 specifies the mode of controlling the global scope of service logic. The supported modes are manyPerService, onePerService, manyPerAddress, onePerAddress, and none. Gsi Address Lookup Table 1221 and Address Lookup Table 1222 are service tables used for respective address lookups. To specify this, click Edit of corresponding field. Address types 1230 enumerate supported address types, in this example identified by the originating network protocol.

Figure 13:
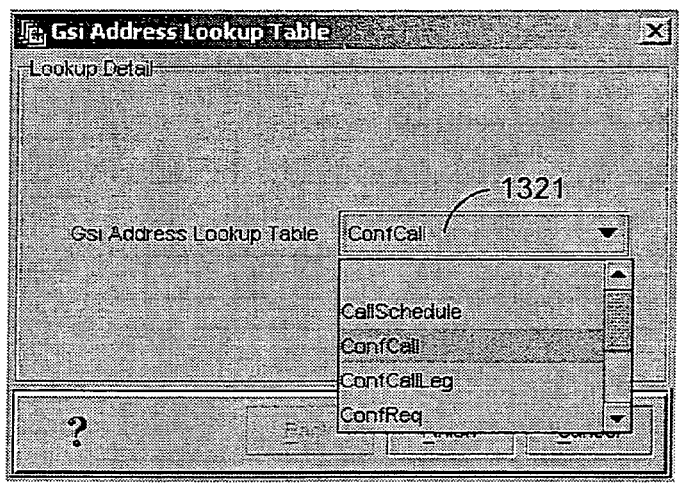
FIG. 13 is a graphical user interface to a Gsi Address lookup table.
Figure 14:
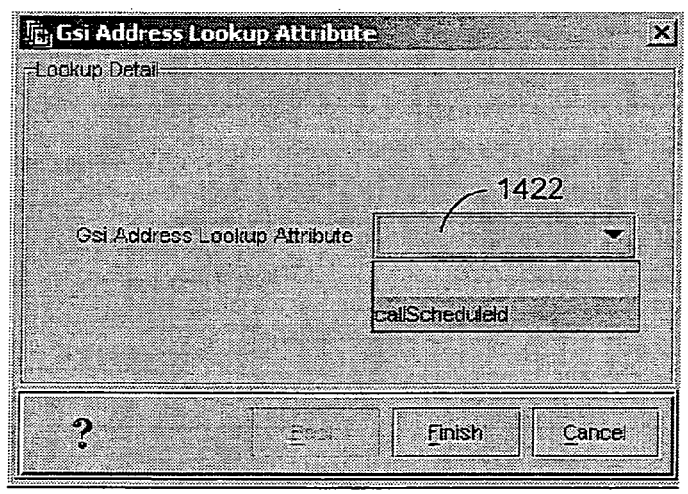
FIG. 14 is an Address Lookup interface.
Figure 15:
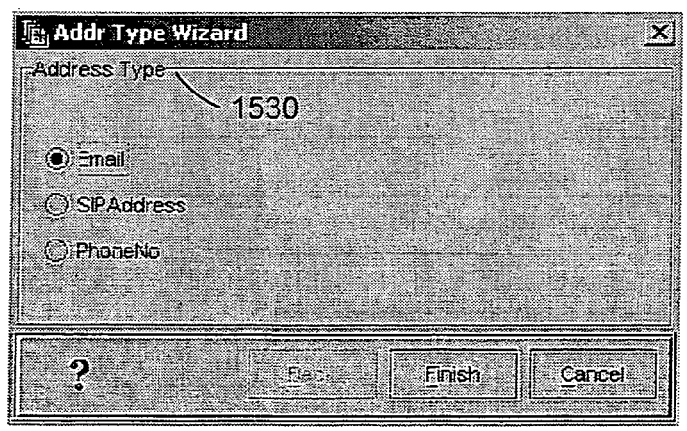
FIG. 15 is an interface for selecting an address type.

FIG. 13 is a graphical user interface to a Gsi Address lookup table. Select the required table from the drop down list 1321. Gsi Address Lookup attribute, which is a unique key attribute or indexed attribute of "global-svc" scope, present in Gsi Address Lookup Table. To specify this attribute, click Edit, and FIGS. 14 and 15 become accessible. In FIG. 14, Address Lookup attribute 1422 is a unique key attribute or indexed attribute of "global-svc" scope, present in Address Lookup Table. Addr Types 1530 in FIG. 15 are the elements that define the types of subscriber addresses that the service supports. Those of skill in the art will recognize that a pick list or other control style can be substituted for the radio buttons illustrated. New Addr Types can be added.

The hierarchical tree of FIG. 3 provides access to interfaces for identification of properties, tables, beans and file types. Both of the service and subscriber views will maintain the service properties, tables, beans (both Java and Enterprise Java Beans) and file tables of their respective scope; service view maintains the "svc-global" scope whereas subscriber view maintains "subscriber" scope. These four simple interfaces are not reproduced, because they include a name, a set of action buttons, and, for beans, identification of a bean as a Java Bean or EJB. More elaborate interfaces defining easily named entities appear as FIGS. 16 through 26.

Figure 16:
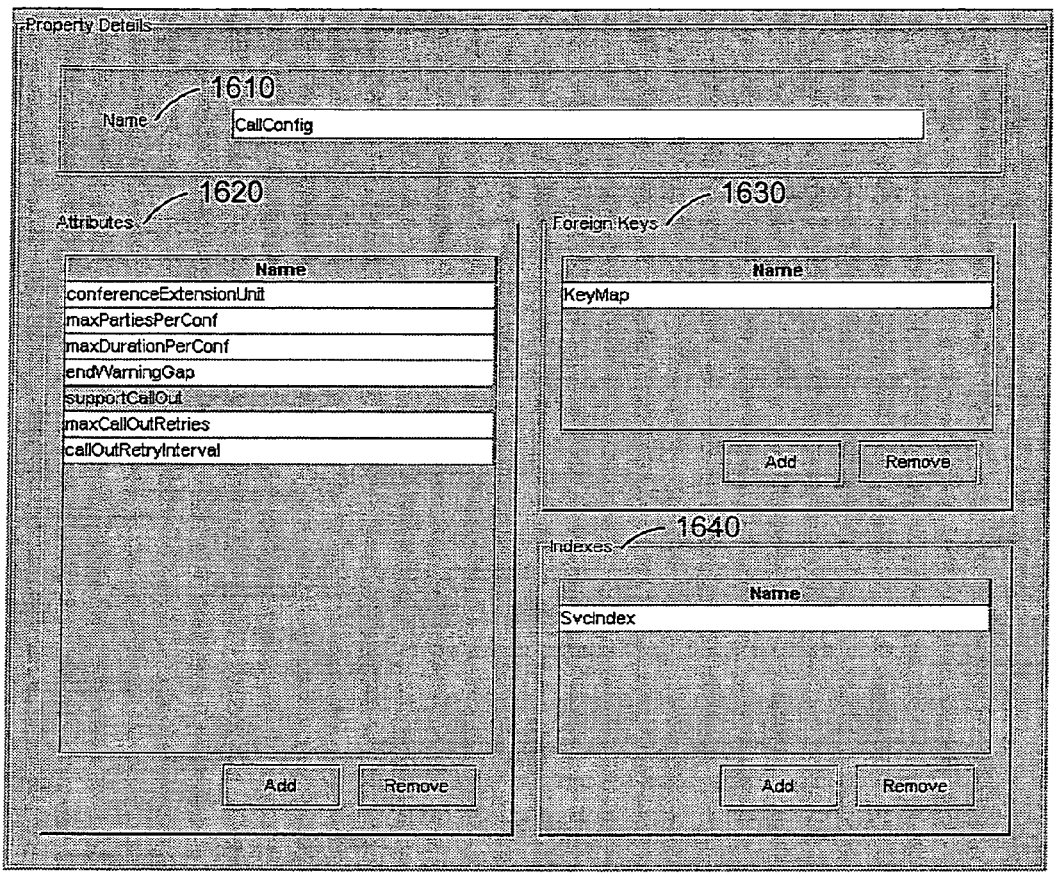
FIG. 16 is a graphical user interface for specification of service properties.

FIG. 16 is a graphical user interface for specification of service properties. Property Name 1610 is a name of a service property (maximum 14 characters). As described above, a service property contains zero or more attributes 1620, foreign keys 1630 and indexes 1640. For these elements, there are corresponding action buttons.

Figure 17:
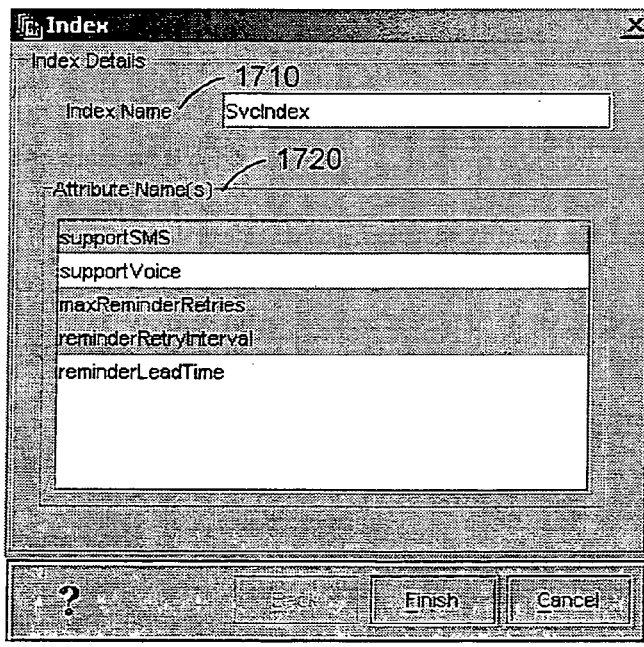
FIG. 17 is a graphical user interface for adding an index, to enhance system performance.

FIG. 17 is a graphical user interface for adding an index, to enhance system performance. Index Name 1710 is a name of a service index (max 14 characters). Attribute Name(s) 1720 are one or more attributes to be indexed by this index. The index present in property will have unique scope as "svc-global".

Figure 18:
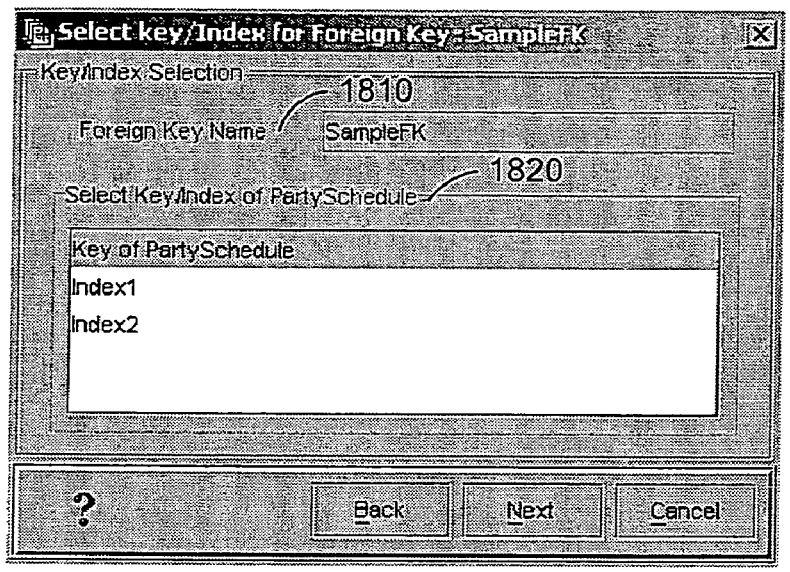
FIGS. 18 and 19 illustrate two out of three steps for creating a foreign key.
Figure 19:
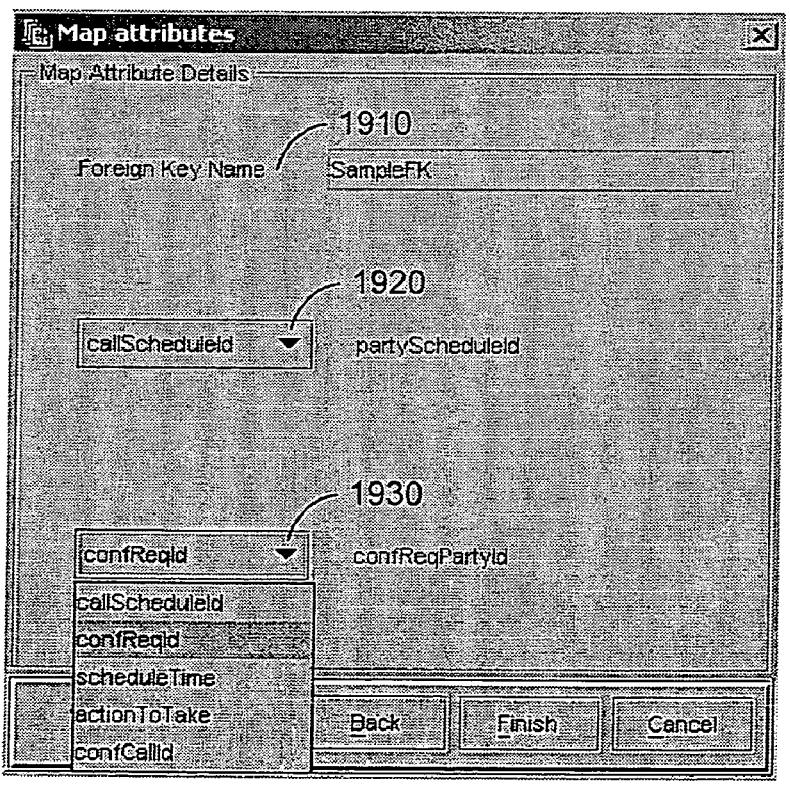

FIGS. 18 and 19 are two out of three steps for creating a foreign key. Omitted is the simple interface for naming the foreign key and associating it with a foreign table. Foreign key can be either mapped to one or more key(s) or to an index to a foreign table. FIG. 18 allows a user to select a key or an index to the foreign table 1820 to associate with the named foreign key 1810. In the next step for a named foreign key 1910, depicted in FIG. 19, the user specifies the mapping between the attributes of the property 1920 and the attributes of the foreign table 1930. Map the current property attribute 1920 by selecting the foreign attribute from drop down list 1930.

Figures 20, 21:
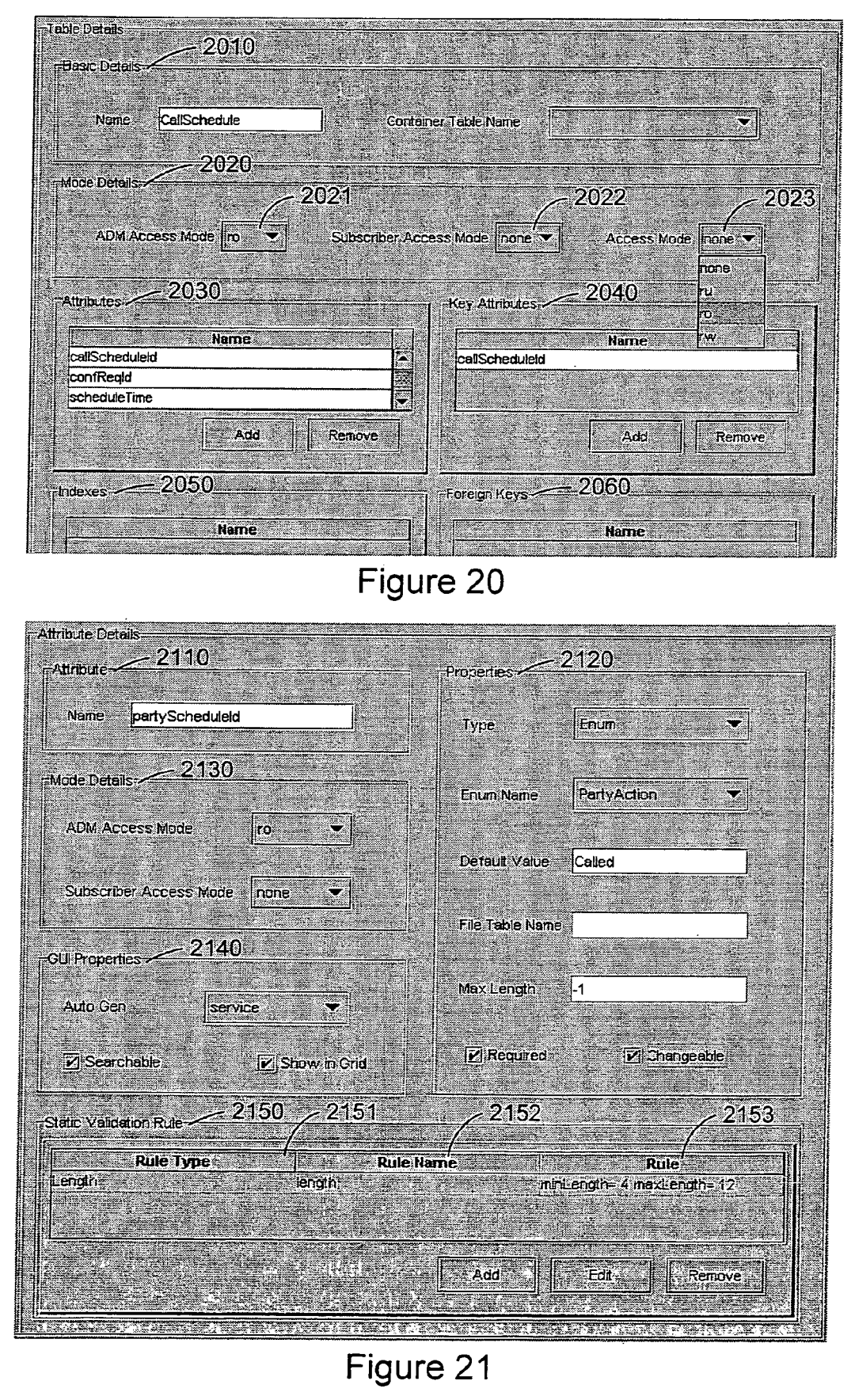

FIG. 20 is a graphical interface for defining a service table, including defining basic details 2010, mode details 2020, attributes 2030, key attributes 2040, indexes 2050 and foreign keys 2060. Name is a name of service table (maximum 14 characters). Container Table Name is the name of the container table, if this table is nested. ADM Access Mode 2021, Subscriber Access Mode 2022 and Access Mode 2023 specify the access given to administrators, subscribers and users for this table. The access modes include none, ro—read only, ru—read, and rw—read write. A service table should contain at least one key attribute 2040. Adding of a service attribute 2030, index 2050 and foreign key 2060 to a table is same as for a service property, except table index can have both "svc-global" and "subscriber" unique scopes.

FIG. 21 is a graphical interface for defining attribute details, including its name 2110, properties 2120, mode details 2130, GUI properties 2140 and static validation rules 2150. Attribute Name 2110 is a name of the service attribute. ADM Access Mode and Subscriber Access Mode are used to define access rights for administrators and subscribers to this attribute. Supported rights may include rw—read write, ro—read only, rc—read create or none. There are three properties for GUI 2140 for this attribute. The Auto Generated will specify whether this attribute is auto generated by service, subscriber or none. The developer can also specify whether the attribute is searchable and whether to show the attribute in a grid. In properties 2120, type is the attribute type from the defined types. Enum Name is the name of the enumerator. This corresponds to the Enum from Enum Tab. This can be specified only if the Type is Enum of FIG. 11. Default Value is an optional default value for the attribute. It can be a constant, literal or an Enum item. It can be extended to a value calculated from other fields. File Table Name is the file table name when the type is FileName. Max Length for Types String, FileName or DigitString indicates the number of characters the value of this attribute can be. A useful default for these types is 20. For other types it does not matter. Required may be checked or not. Changeable may be if checked to enable the attribute to be modified by the system. Validation Rule Type 2150 is a rule that can be applied to check the validity of the attribute's value. Three supported types of rules include length validation, range validation and regex validation, to check for regular expressions. A rule is given a Rule Name 2152. Then based on the type of rule, the rule is defined 2153. In this example length validation has minimum and maximum length values. To add a static validation rule, click Add. Supporting interfaces depicted in FIGS. 22-23 become accessible.

Figure 22:
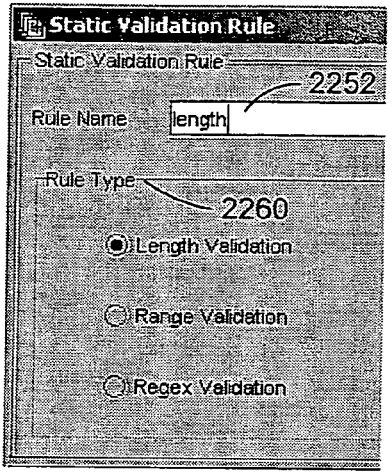
FIG. 22 is an interface for selecting a rule type.
Figure 23:
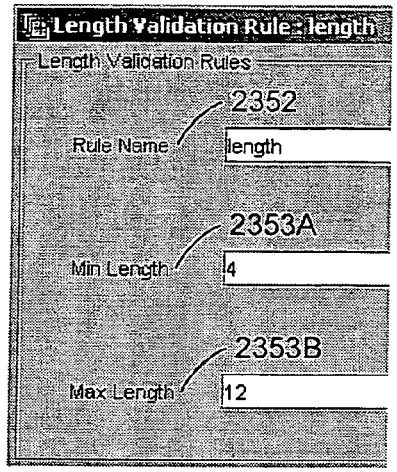
FIG. 23 allows definition of a rule.

In FIG. 22, rule name 2252 is a user defined name for the rule. Rule Type 2260 is a control for selecting a supported type of rule. FIG. 23 corresponds to the length validation rule 2153, allowing entry of the rule name 2352, minimum length 2353A and maximum length 2353B.

Figure 24:
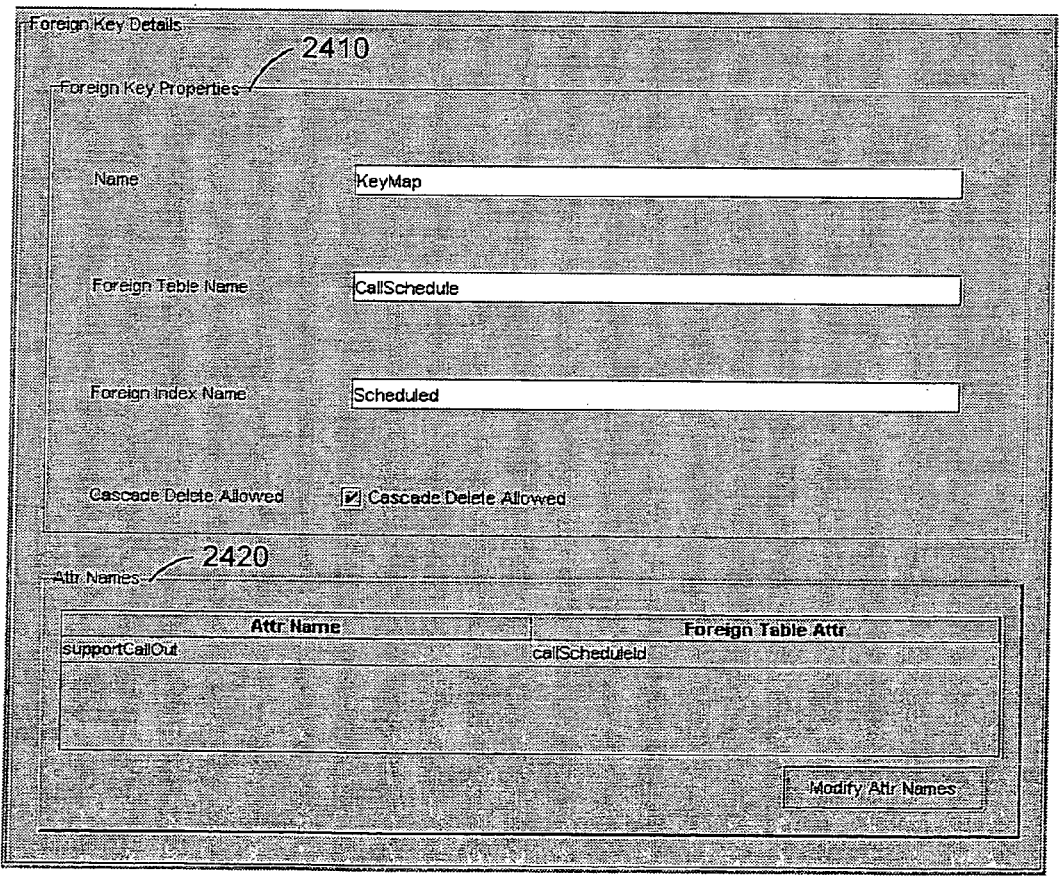
FIG. 24 is an interface for entry of foreign keys.
Figure 25:
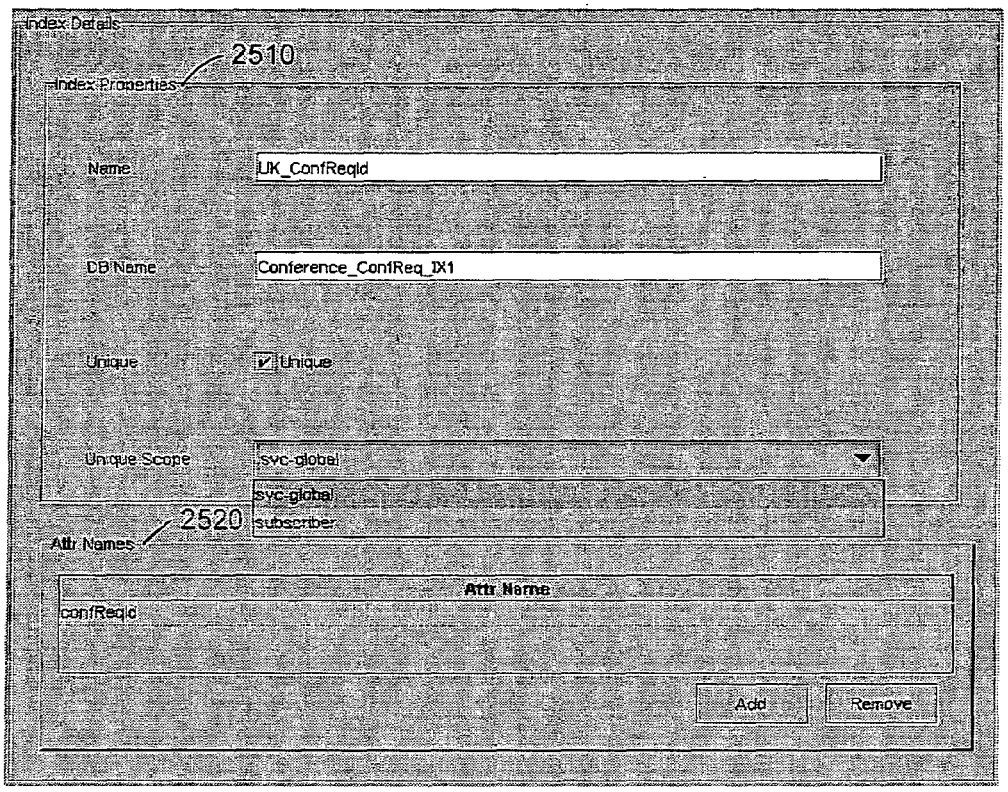
FIG. 25 is a graphical interface for a user to specify index details.

FIGS. 24-25 are interfaces for entry and mapping of foreign keys. The detailed information for a foreign key includes properties 2410 and attribute name 2420. Name is a name of a foreign key. Foreign Table Name is a name of foreign table. Foreign Index Name is used when a foreign key is associated with the index of the foreign table to indicate the name of the foreign index. Cascade Delete Allowed may be checked or not. Attr Names 2420 is a list that contains the mapping of the current table or property's attribute (Attr Name) with the foreign table's attribute (Foreign Table Attr). Clicking on Modify Attr Names can change the existing mapping of attributes.

FIG. 25 is a graphical interface for a user to specify index details. The index details include index properties 2510 and attribute names 2520. Name is a name of service index (Max 14 characters). DB Name is a database name for the index. Unique is checked, when the index is unique within the table. Unique Scope is a pick list for selection of the scope of the index. For the Index in Service-View, i.e. "svc-global", should have "svc-global" scope. Attr Names 2520 specifies the attributes indexed by the index. User can add or remove attributes to the list.

Not depicted in the figures are graphical interfaces for defining operations, file table names, an I18N file, and a packaging view.

Figure 26:
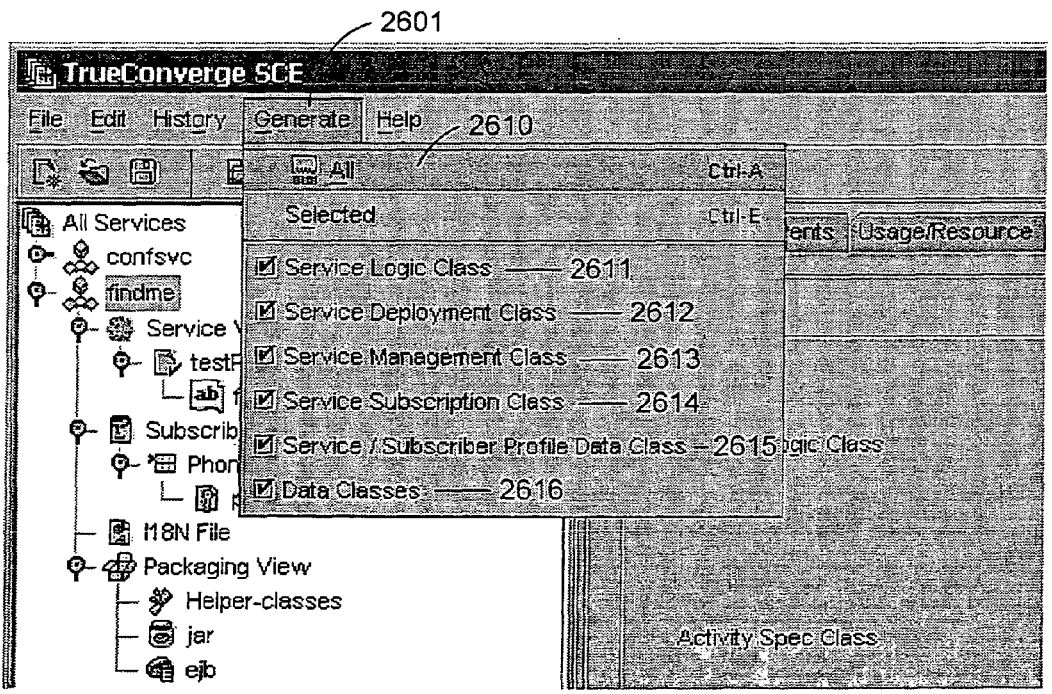
FIG. 26 is a pull-down menu that allows a developer to invoke aspects of automatic code generation.

FIG. 26 is a pull-down menu that allows a developer to invoke aspects of automatic code generation. The developer can select generation of all available components or can select specific components. In this illustration, the specific components listed are service logic class 2611, service deployment class 2612, service management class 2613, service subscription class 2614, service/subscriber profile data class 2615, and data classes 2616. This logic automates the common code generation thereby eliminating the error prone manual coding.

Figure 27:
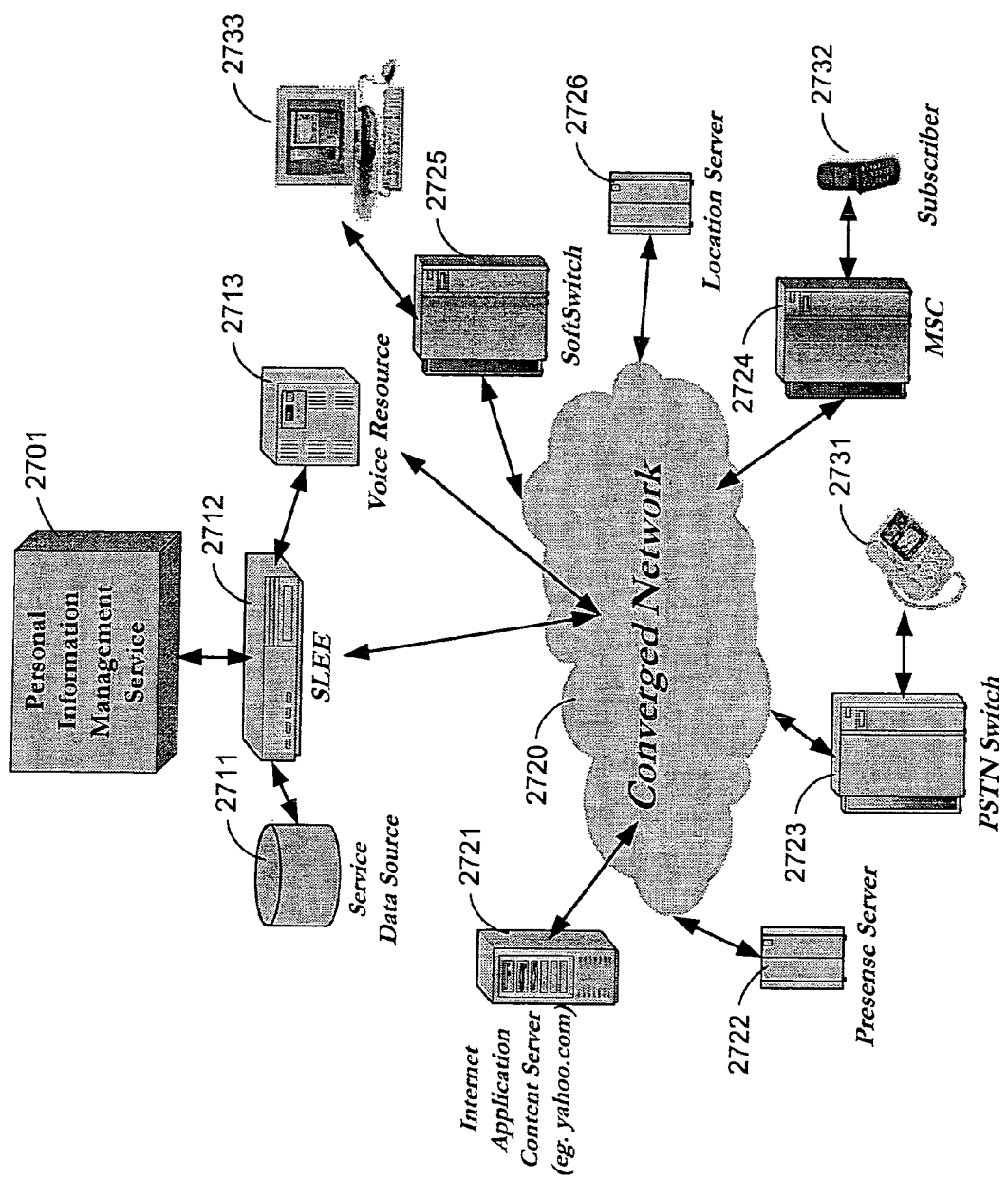
FIG. 27 illustrates a converged network.

FIG. 27 illustrates the converged network that has been referred to above, in the context of a converged service for personal information management 2701. In the converged network, data flows through the communications network 2720 from a variety of sources. Communication events from any of these sources can generically be referred to as a call, regardless of whether a voice or data message is involved. Adapters in a service logic execution environment 2712 receive calls from these heterogeneous networks. The personal information management service 2701 operates in the service logic execution environment 2712. It accesses a service data source 2711 and also may access a voice resource 2713. A wide variety of sources are illustrated in the figure. An Internet application content server 2721, such as a Yahoo! server may be in communication with the SLEE 2712. A presence server 2722 or location server 2726 also may be in communication with the SLEE 2712. Voice networks also may be in communication with the SLEE 2712, such as voice networks supported by a wired PSIN switch 2723, a wireless MSC switch 2724 or voice over IP Softswitch 2725. The convergence of voice networks allows subscribers using a conventional handset 2731, a wireless handset 2732 or PC-based voice equipment 2733 to access the personal information management service 2701. Aspects of the present invention support development and deployment of advanced services such as a personal information management service.

From the preceding description, it will be apparent to those of skill in the art that a wide variety of systems and methods can be constructed from aspects and components of the present invention. One embodiment is a telecommunications system including a service logic execution environment. The SLEE supports a plurality of services and complies with a telecommunications computing standard, such as JAIN SLEE. The system further includes a first service operable on the SLEE utilizing service data corresponding to a machine readable specification. The machine readable specification includes definitions of data attributes having types and optionally being required, having a default value and having valid values. The definitions further include tables of data attributes adaptable to store configuration data for the service and validation rules. The validation rules may apply to individual attributes, may compare attributes in a single row or record, or may compare data attributes among rows or records. Additional aspects of this embodiment include defining data attributes as automatically generated. The definitions further may include identification of one or more methods that can be invoked by the service to apply additional validation rules. A variation on this embodiment is a machine readable specification for service data used by a service operable in the SLEE. This variation includes the aspects and options of the first embodiment, without including the SLEE itself.

A second embodiment is a data interface generator, generating an interface to data used by a service sharing a SLEE. The data interface generator includes first logic operable on a computer system. The first logic acts upon or is responsive to a machine readable specification. The specification includes aspects and options of the machine readable specification described above. The first logic is adapted to utilize information in the specification to generate a data interface. Generating the data interface may include generating a data model that maps data attributes, types and tables to database fields types and tables. In may include generating second logic that accesses and persists data corresponding to the data model. It further may include generating third logic that implements the validation rules of the specification. A further component of the first logic may be adapted to generating a data base definition that implements the data model. This data base definition may be run on a database system to generate a physical database. Another component of the first logic may be adapted to generate a provisioning interface that is accessible through a network and facilitates user entry of values corresponding to at least some of the data attributes. The first logic may validate the specification against a data schema.

Another embodiment is a graphical interface including a plurality of user interfaces to collect information corresponding to one or more machine readable specifications. The user interfaces may be organized to collect information including a service name, one or more attribute definitions and service data definitions, including service properties and service tables. This embodiment further may include collection of class names of objects implementing service interfaces. It further may include collection of specifications for communications events to which the service will respond. If further may identify usage parameters that the service compiles during operation. The user interfaces may further be organized to collect validation rules and/or methods that can be invoked to apply external validation. Other user interfaces may be provided to collect enumerator data type definitions, including enumeration values.

A combined embodiment includes a graphical interface, such as the one described above, and logic adapted to generate useful software components. The useful software components may include data model that maps data attributes, data types and tables to database fields, data types and tables. It may include generating logic to access and persist data corresponding to the data model. It also, or alternatively, may include generating logic that implements the validation rules. Optionally, the data interface generator logic may be adapted to generate a data base definition that a database system can use to generate a physical database. In general, these embodiments may utilize one or more machine readable specifications, one of which may be compliant with a version of a telecommunications standard, such as JAIN SLEE, and the other supplementing the standard.

While the present invention is disclosed by reference to the preferred embodiment and example detailed above, it is understood that these examples are intended in an illustrative rather than in a limiting sense. Computer-assisted processing is implicated in the described embodiments. Accordingly, the present invention may be embodied in methods for computer-assisted processing, systems including logic to specify and generate data interfaces and structures, media impressed with logic to specify and generate data interfaces and structures, data streams impressed with logic to specify and generate data interfaces and structures, or computer-accessible services that specify and generate data interfaces and structures. It is contemplated that modifications and combinations will readily occur to those skilled in the art, which modifications and combinations will be within the spirit of the invention and the scope of the following claims.

We claim:

1. A telecommunications system development tool for specifying services to be deployed on a shared device, a device including:

a service logic execution environment ("SLEE") that is running on a device, supporting a plurality of services, and that is compliant with a telecommunications computing standard for SLEEs;

a first service operating in the service logic execution environment utilizing service data corresponding to a computer-readable specification, the computer-readable specification including definitions of:

data attributes having types and optionally being required, having a default value and having valid values, the definition of the data attributes being used to automatically generate the data attributes that store the service data;

tables of data attributes adaptable to store configuration data for the service; and validation rules for data attributes, among data attributes in rows of the tables, among data attributes across the rows in the tables the validation rules being used to validate the automatically generated data attributes.

2. The device of claim 1, wherein the definitions further include identification of one or more methods that can be invoked by the service to apply additional validation rules.

3. A computer-readable storage medium having instructions for specifying service data used by a service, the service sharing a service logic execution environment ("SLEE") that is compliant with a telecommunications computing standard for SLEEs, the service being responsive to events generated by handling calls, the computer-readable specification accessible in memory of the service logic execution environment including definitions of:

data attributes having types and optionally being required, having a default value and having valid values, the definition of the data attributes being used to automatically generate the data attributes that store the service data;

tables of data attributes adaptable to store configuration data for the service; and validation rules for data attributes, defining validation relationships among data attributes in particular rows of the tables and among data attributes across different rows in the tables, the validation rules being used to validate the automatically generated data attributes.

4. The storage medium of claim 3, wherein the definitions further include identification of one or more methods that can be invoked by the service to apply additional validation rules.

5. A data interface generator development tool for specifying and generating code that implements a service to be deployed on a shared device, the data interface generator including:

primary logic operating on a computer system generating an interface to data used by a service sharing a service logic execution environment that is compliant with a telecommunications computing standard with a plurality of other services, the service and other services being responsive to events generated by handling calls, the primary logic including:

first logic acting upon a computer-readable specification that defines the interface to the data used by the service, the specification including definitions of:

data attributes having types and optionally being required, having a default value and having valid values;

tables of data attributes adaptable to store configuration data for the service;

validation rules for data attributes, defining validation relationships among data attributes in particular rows of the tables and among data attributes across different rows in the tables;

wherein the first logic is adapted to automatically generate a data interface based on the configuration data, including:

generating a data model that maps data attributes, types and tables to database fields, types and tables;

generating second logic that accesses and persists data corresponding to the data model; and generating third logic that implements the validation rules, the validation rules being used to validate the automatically generated data attributes.

6. The data interface generator of claim 5, wherein the definitions further include identification of one or more methods that can be invoked by the service to apply additional validation rules.

7. The data interface generator of claim 5, wherein the first logic is further adapted to generate a data base definition that implements the data model.

8. The interface generator of claim 5, wherein the first logic is further adapted to generate a provisioning interface that is accessible through a network and facilitates user entry of values corresponding to at least some of the data attributes.

9. The data interface generator of claim 5, wherein the first logic is further adapted to validate the specification against a data schema.

10. The data interface generator of claim 5, further including the computer system.

11. A graphical computer interface to a development tool for specifying services to be deployed on a shared device, a device including:

a plurality of computer-implemented user interfaces adapted to collect information corresponding to one or more computer-readable specifications of a service interface for a service sharing a service logic execution environment with a plurality of other services, the service and other services being responsive to events involved in handling calls, the user interfaces organized to collect information including:

a service name;

one or more data attribute definitions, the data attributed defined as having types and optionally being required, being automatically generated, having a default value and having valid values;

service data definitions, including one or more service properties and service tables, wherein the service properties include data attributes and wherein the service table includes tables of data attributes;

validation rules applicable among data attributes in rows of the tables and among data attributes across the rows in the tables, the validation rules being used to validate the automatically generated data attributes;

class names of objects implementing aspects of the service interface;

communications events to which the service will respond;

usage parameters that the service compiles during event handling; and enumerator data type definitions and enumerator item values that can be used by the data attributes.

12. The device of claim 11, wherein the user interfaces are organized to further collect identifiers of methods that can be invoked by the service to apply additional validation rules.

13. A generator of specifications stored on a computer-readable storage medium, a device including:

a plurality of computer-implemented user interfaces running on a device and adapted to collect information corresponding to one or more computer-readable specifications of a service interface for a service sharing a service logic execution environment with a plurality of other services, the service and other services being responsive to events involved in handling calls, the user interfaces organized to collect:

a service name;

one or more data attribute definitions, the data attributed defined as having types and optionally being reguired, being automatically generated, having a default value and having valid values;

service data definitions, including one or more service properties and service tables, wherein the service properties include data attributes and wherein the service table includes tables of data attributes and first logic operable on a computer system to generate a data interface, the first logic being adapted to:

generate a data model that maps the data attributes, types and tables to database fields, types and tables;

generate second logic that accesses and persists data corresponding to the data model; and generate third logic that implements the validation rules, the validation rules being used to validate the automatically generated data attributes.

14. The device of claim 13, wherein the first logic is further adapted to generate a data base definition that implements the data model.

* * * * *